(12) United States Patent
Lee et al.

(10) Patent No.: US 7,708,546 B2
(45) Date of Patent: May 4, 2010

(54) APPARATUS FOR FORMING STRUCTURAL MEMBERS

(75) Inventors: Michael A. Lee, Kent, WA (US); Kurtis S. Willden, Kent, WA (US); Darrell D. Jones, Mill Creek, WA (US); Richard B. Evans, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/354,856

(22) Filed: Jan. 16, 2009

(65) Prior Publication Data

US 2009/0123588 A1 May 14, 2009

Related U.S. Application Data

(62) Division of application No. 11/105,104, filed on Apr. 13, 2005, now Pat. No. 7,527,759.

(51) Int. Cl.
*A01J 21/00* (2006.01)
(52) U.S. Cl. ............... 425/423; 425/356; 425/451.9
(58) Field of Classification Search .......... 425/356, 425/423, 451.9
See application file for complete search history.

(56) References Cited

U.S. PATENT DOCUMENTS

| | | | |
|---|---|---|---|
| 1,433,879 A * | 10/1922 | Fancher et al. | 72/399 |
| 1,965,716 A * | 7/1934 | Thoms et al. | 72/377 |
| 3,693,924 A | 9/1972 | Blatherwick | |
| 3,843,756 A | 10/1974 | Talbott et al. | |
| 3,990,291 A * | 11/1976 | Evertz et al. | 72/382 |
| 4,254,735 A | 3/1981 | Postupack et al. | |
| 4,270,964 A | 6/1981 | Flaskett | |
| 4,366,698 A * | 1/1983 | Gill | 72/389.4 |
| 4,367,644 A | 1/1983 | Kramer et al. | |
| 4,411,148 A * | 10/1983 | Aschauer et al. | 72/306 |

(Continued)

FOREIGN PATENT DOCUMENTS

DE 742 682 12/1943

(Continued)

OTHER PUBLICATIONS

Search Report and Written Opinion for PCT/US2006/010825 dated Oct. 16, 2006.

*Primary Examiner*—Joseph S Del Sole
*Assistant Examiner*—David N Brown, II
(74) *Attorney, Agent, or Firm*—Alston & Bird LLP

(57) ABSTRACT

A method and associated apparatus for forming a composite structural member from a charge are provided. The charge can be disposed on a first die of the apparatus and formed to a desired configuration defined by a recess of the die by inserting a second die or a tool into the recess. In some cases, the first die can include two portions that are adjustable in a transverse direction so that the recess can be opened by the insertion of the second die or tool. The second die or tool can be a substantially rigid member or an inflatable bladder. In either case, the charge can be disposed on the first die, formed, and then further processed on the first die, thereby facilitating indexing of the charge for each operation.

19 Claims, 31 Drawing Sheets

U.S. PATENT DOCUMENTS

| | | | |
|---|---|---|---|
| 4,475,976 A * | 10/1984 | Mittelstadt et al. | 156/286 |
| 4,504,341 A | 3/1985 | Radzwill et al. | |
| 4,614,558 A | 9/1986 | Kobe | |
| 4,657,717 A | 4/1987 | Cattanach et al. | |
| 4,726,924 A * | 2/1988 | Mittelstadt | 264/257 |
| 5,022,248 A * | 6/1991 | Brooks et al. | 72/21.1 |
| 5,040,962 A | 8/1991 | Waszeciak et al. | 425/112 |
| 5,060,501 A * | 10/1991 | Heath | 72/382 |
| 5,108,532 A | 4/1992 | Thein et al. | |
| 5,304,057 A | 4/1994 | Celerier et al. | |
| 5,327,764 A * | 7/1994 | Weykamp et al. | 72/296 |
| 5,366,431 A | 11/1994 | Smith et al. | |
| 5,366,684 A | 11/1994 | Corneau, Jr. et al. | |
| 5,582,058 A * | 12/1996 | Knudson | 72/379.2 |
| 5,714,179 A | 2/1998 | Goodridge et al. | |
| 5,882,462 A | 3/1999 | Donecker et al. | |
| 5,939,007 A * | 8/1999 | Iszczyszyn et al. | 264/258 |
| 6,139,942 A | 10/2000 | Hartness et al. | |
| 6,269,677 B1 * | 8/2001 | Torvinen et al. | 72/461 |
| 6,723,272 B2 | 4/2004 | Montague et al. | |
| 6,814,916 B2 * | 11/2004 | Willden et al. | 264/257 |
| 6,823,578 B2 | 11/2004 | Anderson et al. | |
| 6,855,284 B2 * | 2/2005 | Lanni et al. | 264/295 |
| 6,929,770 B2 * | 8/2005 | Caldwell, Jr. | 264/510 |
| 7,091,300 B2 | 8/2006 | Luhmann et al. | |
| 7,141,199 B2 * | 11/2006 | Sana et al. | 264/255 |
| 7,160,498 B2 * | 1/2007 | Mataya | 264/510 |
| 2004/0041304 A1 | 3/2004 | Willden et al. | |
| 2004/0043196 A1 | 3/2004 | Willden et al. | |
| 2004/0145080 A1 * | 7/2004 | Tanaka | 264/257 |
| 2005/0051932 A1 * | 3/2005 | Danzik | 264/511 |
| 2005/0086991 A1 | 4/2005 | Barnett | |
| 2005/0142239 A1 * | 6/2005 | Frank | 425/398 |

FOREIGN PATENT DOCUMENTS

| | | |
|---|---|---|
| DE | 42 34 002 A1 | 4/1994 |
| FR | 2 035 314 | 12/1970 |
| GB | 2139934 A * | 11/1984 |

* cited by examiner

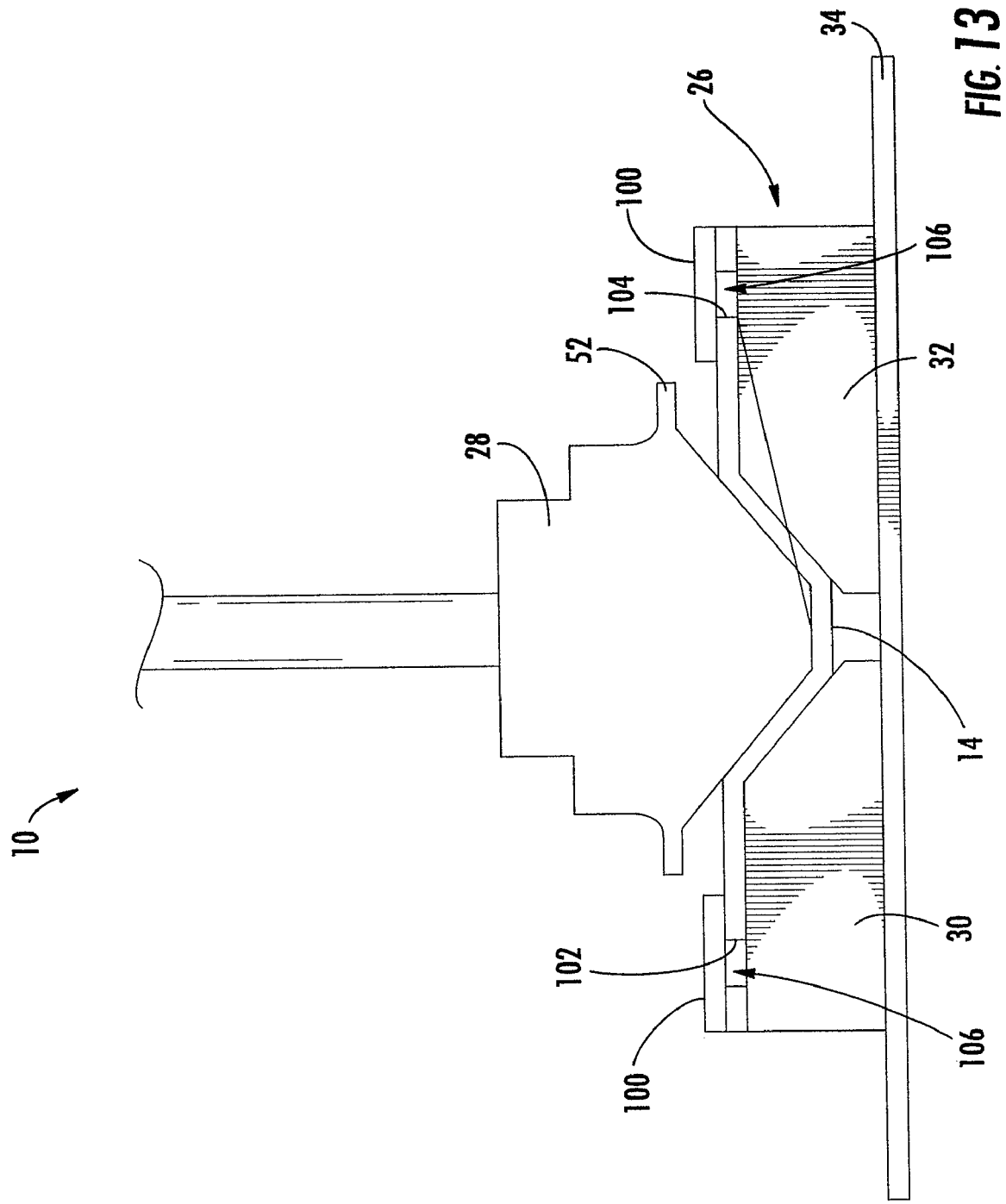

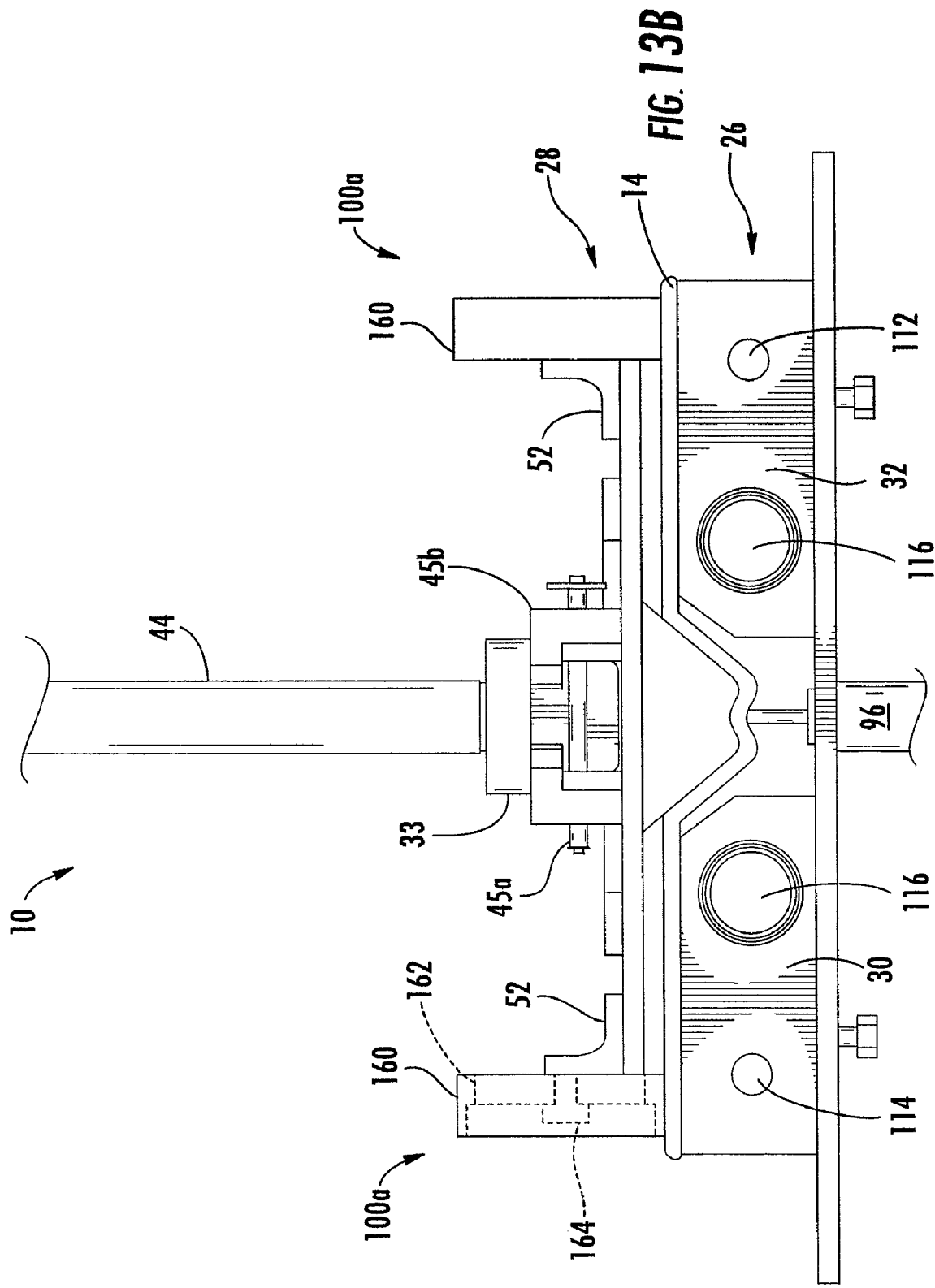

APPARATUS FOR FORMING STRUCTURAL MEMBERS

CROSS-REFERENCE TO RELATED APPLICATIONS

This application is a divisional of U.S. application Ser. No. 11/105,104, filed Apr. 13, 2005 now U.S. Pat. No. 7,527,759, which is hereby incorporated herein in its entirety by reference.

BACKGROUND OF THE INVENTION

1. Field of the invention

The present invention relates to the manufacture of structural members and, more particularly, relates to an apparatus and method for forming a contoured structural member.

2. Description of Related Art

Composite members are commonly used in applications, such as aircraft and other vehicles, where light weight and high strength are desired or required. Often the composite members must be formed in a contoured configuration according to the particular application for the member. Complex contoured composite members are typically configured in a desired configuration while the composite material is in a "green" or uncured condition and then cured while supported in the desired configuration. One conventional method for forming such contoured composite members is by manually laying the composite materials onto a mandrel or other tool defining a male pattern corresponding to the desired configuration. For example, the composite material can be disposed as pre-impregnated composite fiber plies ("prepregs") such as epoxy impregnated carbon fiber laminates. The plies are laid by hand onto the mandrel, and cured on the mandrel to form the member, typically using heat and/or pressure. Alternatively, the composite material can be disposed as dry fabric plies ("dry fabric"), and a bonding material can be added separately. In either case, the resulting structural member can be formed in a variety of desired shapes. However, such a manual layup process is time-consuming. Further, a separate mandrel must typically be provided for forming each particular configuration of composite member.

According to another conventional method for manufacturing composite members, known as drape forming, a flat sheet-like laminate charge or blank of composite material is formed against a mandrel. In particular, the charge is heated and forced around the male mandrel using a vacuum bag. Drape forming has been used successfully to form composite parts where the parts being formed have only a few prepreg plies. However, for thick laminates and complex shapes such as composite members defining C-, I-, or L-shaped beams, long flange lengths, contours along their length, variable thicknesses, joggles (or changes in direction), or offsets, vacuum bag drape forming can result in wrinkling of the plies.

U.S. Patent Application Publication No. 2004/0043196, titled "Forming Method for Composites," published Mar. 4, 2004, which is assigned to the assignee of the present application, describes a system and method for forming composite materials and reducing buckling of the fibers of the composite material. In particular, a composite charge can be formed over a mandrel using bladders and heater plates. U.S. Patent Application Publication No. 2004/0041304, titled "Composite Spar Drape Forming Machine," published Mar. 4, 2004, which is also assigned to the assignee of the present application, also describes a machine and method for forming composite materials about a mandrel. Both of U.S. Patent Application Publication Nos. 2004/0043196 and 2004/0041304 are incorporated by reference in their entirety.

While the foregoing devices and methods are useful for forming composite members, there exists a continued need for an improved apparatus and method for forming composite members. The method should be capable of producing composite members that define various contours, including contours including variations in thickness, curves, angles, flanges, and the like.

SUMMARY OF THE INVENTION

The present invention provides an apparatus and associated method for forming a structural member from a charge or blank. The charge can be disposed on a first die of the apparatus and formed to a desired configuration defined by a recess or cavity of the die by inserting a second die or a tool into the recess.

According to one embodiment of the present invention, the apparatus includes a first die supported by a frame. The first die has first and second longitudinal incompressible portions that are transversely adjustable between first and second positions to adjust a recess between the portions. A second die, which is also supported by the frame, defines an outer surface that corresponds to the recess of the first die. At least one of the dies is adjustable relative to the frame in a direction toward the opposite die so that the second die can be inserted into the recess of the first die, thereby adjusting the portions of the first die transversely outward and forming the charge between the first and second dies to the configuration of the structural member. At least one motion control device is configured to control the transverse adjustment of the portions of the first die. The first die can also be adapted to restrain transverse motion of the charge so that the opposite surfaces of the charge are stressed in tension during forming. The first die can be readily removable from the support frame with the formed charge supported by the die in the configuration of the structural member, e.g., without reconfiguration of the support frame and the second die so that the die can support the formed charge during a subsequent processing operation. In some cases, one or both of the dies can be flexible, and lock devices can be provided for retaining a position of each of the portions of the first die. Both of the dies can include a plurality of segments that are connected longitudinally.

According to another aspect, the present invention provides an apparatus including a support tray and first and second portions of a die that are supported by the tray. Each portion extends in a longitudinal direction and is transversely adjustable to define a recess between the portions for at least partially receiving the charge during forming. The position of each portion can be retained by one or more locks.

In addition, the present invention provides an apparatus including a die defining an aperture corresponding to a predetermined configuration of the structural member and a tool configured to be inserted into the aperture. A positioning device is configured to insert the tool at least partially into the aperture and thereby form the charge to a configuration defined between the tool and the die. In addition, a forming device is configured to adjust a portion of the charge outside the aperture of the die and thereby wrap the charge at least partially around the tool. The forming device and/or the positioning device are configured to compact the charge against the tool and thereby form the structural member to the predetermined configuration of the structural member. The tool can be a rigid member or an inflatable bladder, and the positioning device can be configured to selectively engage and disengage the tool so that the tool is configured to be wrapped with the charge. The positioning device can also be configured to urge the tool into the aperture in a first direction, and the forming device can be configured to extend in a second transverse direction to bend one or more of the edges of the charge about the tool.

According to method of the present invention, first and second dies are provided for forming the charge. The first die includes first and second portions that are adjustable in transverse directions between first and second positions and structured in the second position to cooperatively define a recess to at least partially receive the second die. A charge is disposed between the dies, and the second die is inserted at least partially into the recess so that the portions of the first die are adjusted transversely outward and the charge is formed between the dies to the configuration of the structural member. Each portion of the first die can be biased transversely inward to control the transverse motion of the portions.

The charge can be constrained to the first die so that the opposite surfaces of the charge are stressed in tension during forming, such as by evacuating gas through a plurality of apertures defined by the portions of the first die. In some cases, the first die is flexed during forming, and the position of the portions of the first die can be locked after the charge is formed. Thus, the charge can be supported by the first die during forming and also during a subsequent processing operation performed after the die is removed from the apparatus. In addition, the charge can be layed-up on the first die as a plurality of composite plies.

According to another method of the present invention, a charge is disposed on a die having first and second longitudinal portions, e.g., as a plurality of plies of a composite material. The portions are adjusted transversely so that the portions cooperatively define a recess. The charge is formed against the portions. Thereafter, while supported on the die, the charge is trimmed to a predetermined configuration of the structural member. The charge can be constrained to the die during forming so that both opposite surfaces of the charge are stressed in tension. Each portion can also be biased transversely inward during forming to control the adjustment of the portions. In addition, the portions of the die can be locked in position after forming to prevent transverse adjustment of the portions during trimming.

According to another embodiment of the present invention, the charge is disposed on a die that defines an aperture, and a tool is inserted at least partially into the aperture to thereby form the charge to a configuration defined between the tool and the die. For example, the tool can be selectively engaged with and disengaged from a positioning device so that the tool can be configured to be wrapped with the charge. A forming device is adjusted outside the aperture of the die to wrap the charge at least partially around the tool. Thereafter, the charge is compacted against the tool to form the structural member in a predetermined configuration such as a tubular configuration. For example, the tool can be inflated, or the positioning device or forming device can be urged toward the tool to compact the charge.

BRIEF DESCRIPTION OF THE DRAWINGS

The accompanying drawings illustrate preferred and exemplary embodiments and are not necessarily drawn to scale.

FIG. 9A is a section view illustrating a portion of the first die along line 9A-9A of FIG. 9.

FIG. 10A is a section view illustrating a portion of the first die as seen in a direction parallel to the longitudinal direction of the first die.

FIG. 13 is an elevation view illustrating an apparatus for forming a structural member according to another embodiment of the present invention.

FIG. 13B is an elevation view illustrating the apparatus of FIG. 13A, shown with the charge partially formed.

DETAILED DESCRIPTION OF THE INVENTION

The present invention now will be described more fully with reference to the accompanying drawings, in which some, but not all embodiments of the invention are shown. This invention may be embodied in many different forms and should not be construed as limited to the embodiments set forth. Like numbers refer to like elements throughout.

Figure 1:
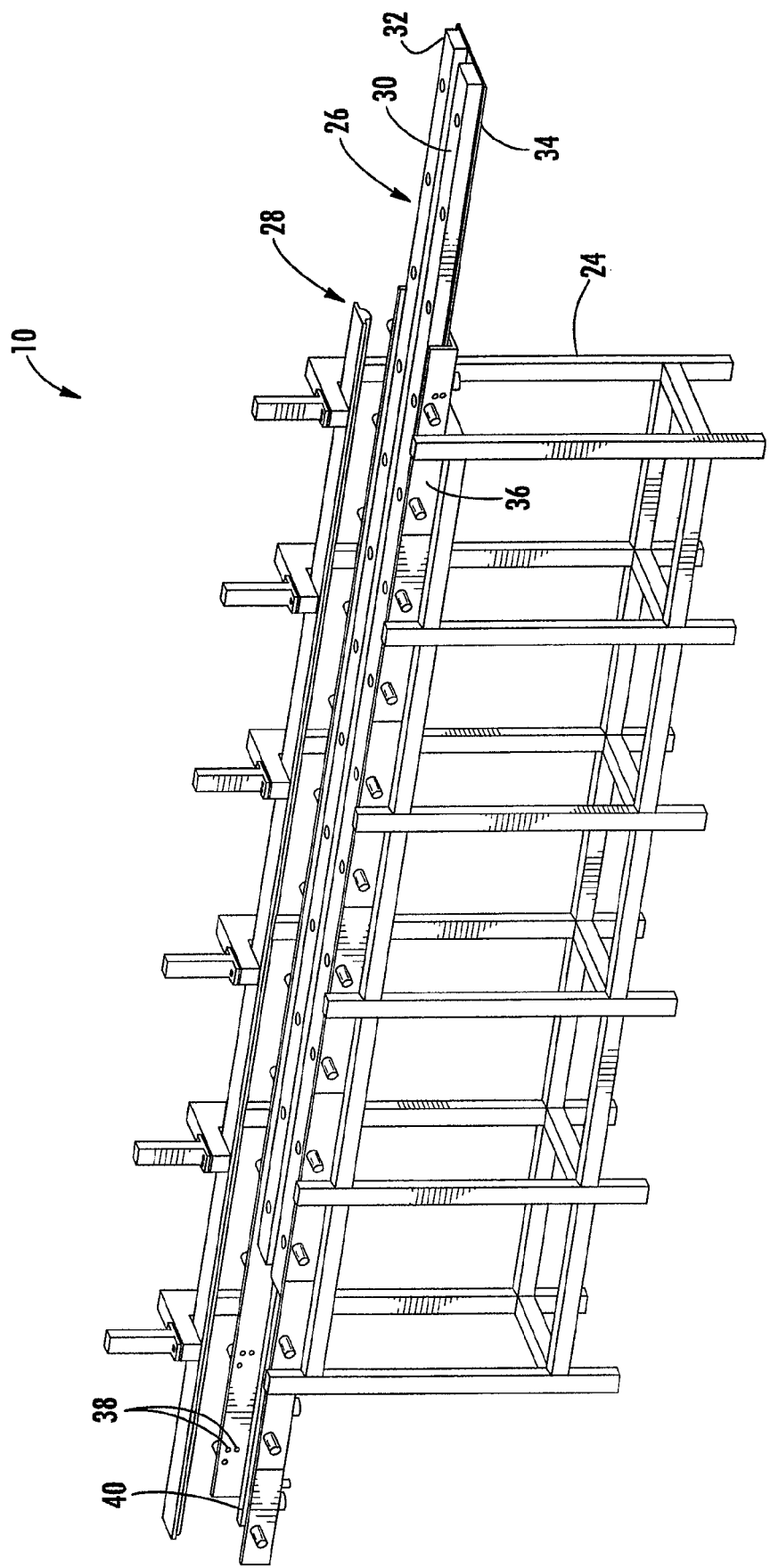
FIG. 1 is a perspective view illustrating an apparatus for forming a structural member according to one embodiment of the present invention.
Figure 5:
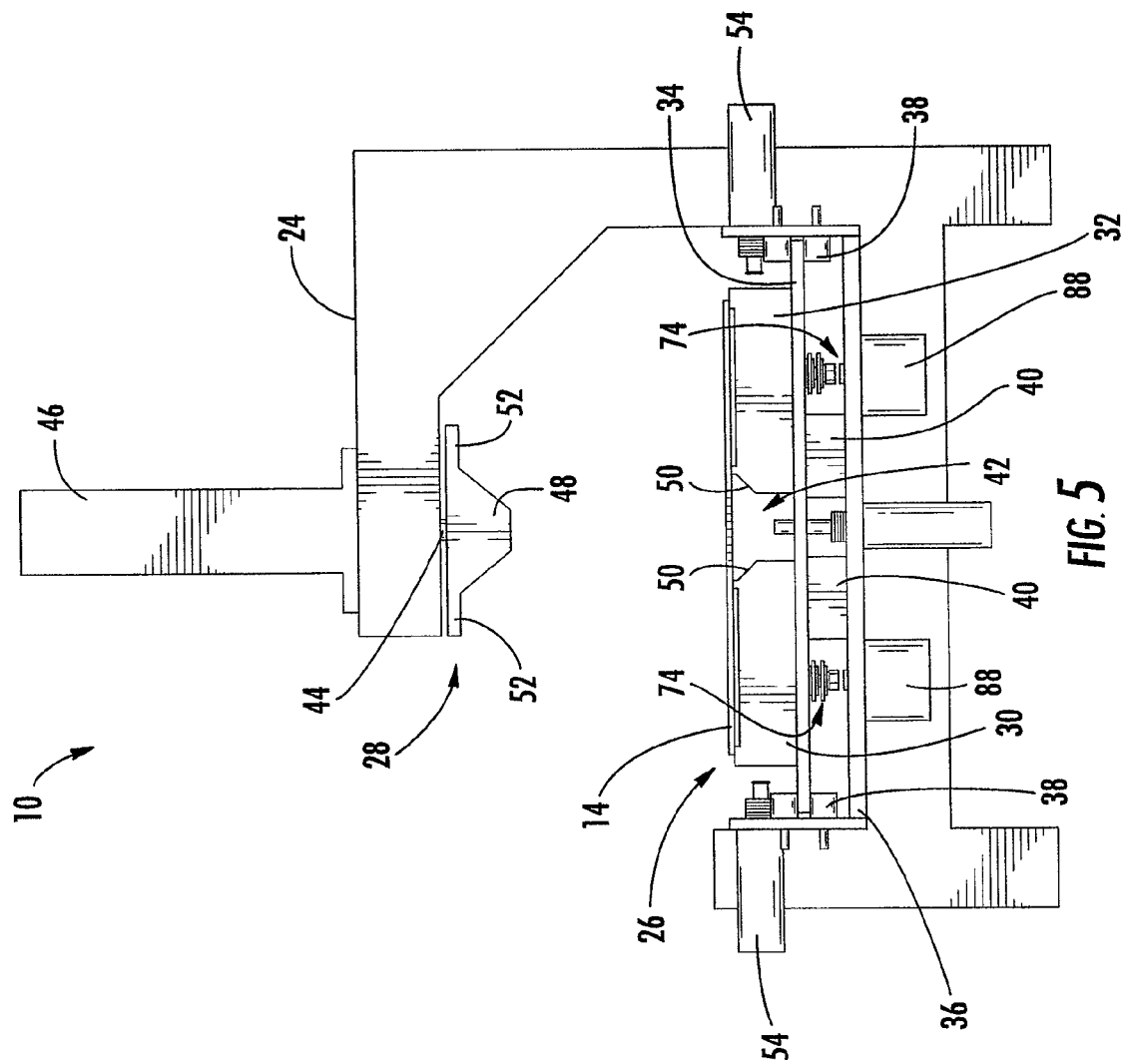
FIG. 5 is an elevation view illustrating the apparatus of FIG. 1.
Figure 12:
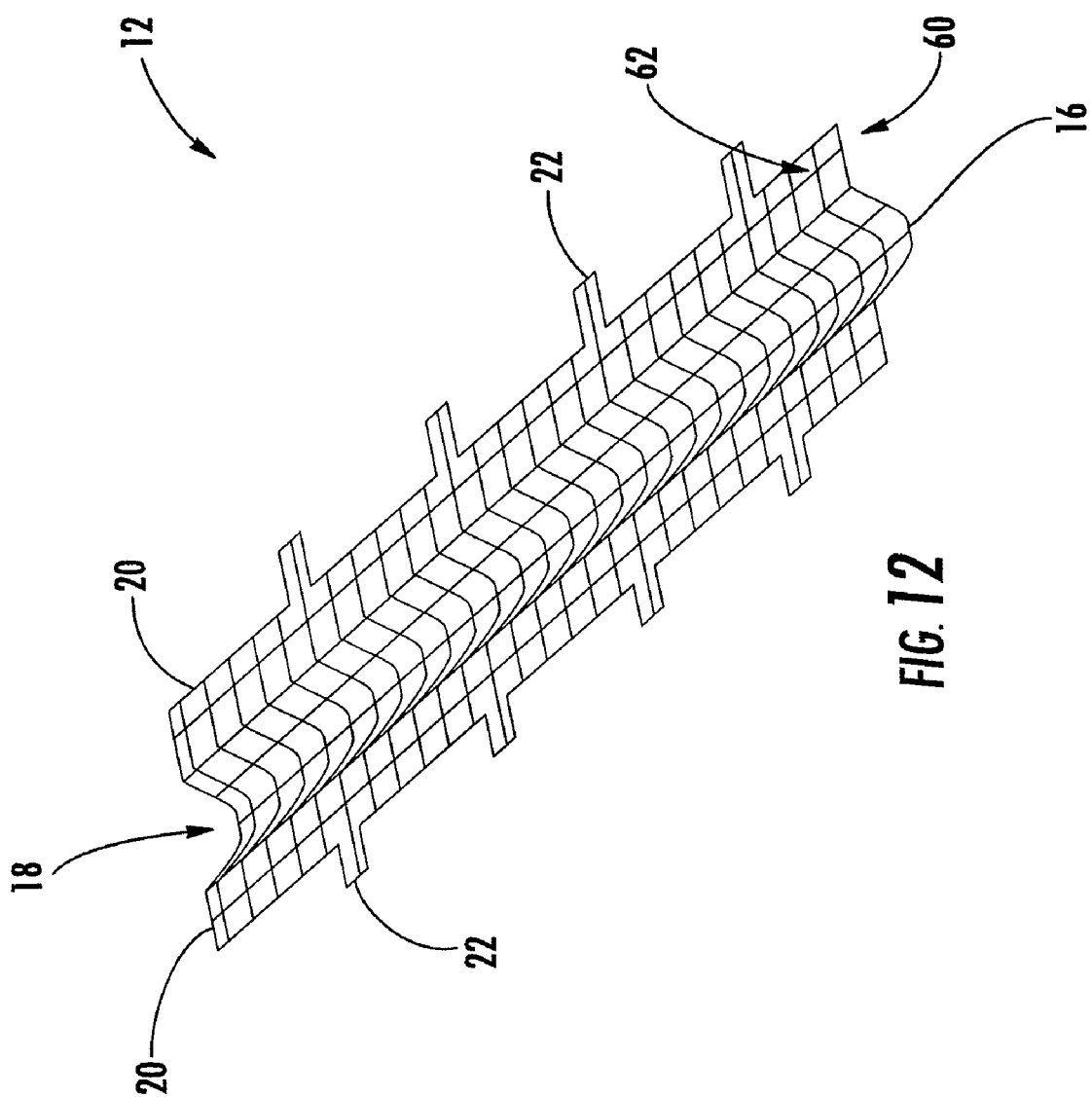
FIG. 12 is a perspective view illustrating a structural member formed by the apparatus of FIG. 1.

Referring now to the drawings, and in particular to FIGS. 1, 5, and 12, the apparatus 10 for forming structural members 12 according to one embodiment of the present invention can be used for forming structural members 12 of various sizes and configurations. The configuration shown in FIG. 12 and described throughout this description is a hat stringer for making a hat section stiffened composite. While shown as generally straight, the stringer may be curved or have complex curvature, as appropriate for the intended application. The structural members 12 are typically manufactured from a blank or charge 14. In particular, the charge 14 can be a laminar member formed of a composite material, i.e., a fibrous reinforcement material disposed in a matrix material. Exemplary composite materials include reinforcement members such as individual fibers, strands, braids, woven or non-woven mats, and the like that are formed of materials such as fiberglass, metal, minerals, graphite or carbon, nylon, aramids such as Kevlar®, a registered trademark of E. I. du Pont de Nemours and Company, and the like. The matrix material can be thermoplastic or thermoset polymeric resins. Exemplary thermosetting resins include allyls, alkyd polyesters, bismaleimides (BMI), epoxies, phenolic resins, polyesters, polyurethanes (PUR), polyurea-formaldehyde, cyanate ester, and vinyl ester resin. Exemplary thermoplastic resins include liquid-crystal polymers (LCP); fluoroplastics, including polytetrafluoroethylene (PTFE), fluorinated ethylene propylene (FEP), perfluoroalkoxy resin (PFA), polychlorotrifluoroethylene (PCTFE), and polytetrafluoroethylene-perfluoromethylvinylether (MFA); ketone-based resins, including polyetheretherketone (PEEK™, a trademark of Victrex PLC Corporation, Thorntons Cleveleys Lancashire, UK); polyamides such as nylon-6/6, 30% glass fiber; polyethersulfones (PES); polyamideimides (PAIS), polyethylenes (PE); polyester thermoplastics, including polybutylene terephthalate (PBT), polyethylene terephthalate (PET), and poly(phenylene terephthalates); polysulfones (PSU); or poly(phenylene sulfides) (PPS). Alternatively, the charge can be formed of other materials, including non-composite or non-reinforced materials including, but not limited to metals, polymers such as thermoplastics and thermosets, and the like, some of which may require heat during forming.

In some cases, the charge 14 is formed of a material with a low level of tackiness. That is, while conventional composite laminate materials typically have a tackiness sufficient for holding the layers of the laminate together during a manual layup operation and subsequent consolidation and forming, the tack level of the materials used in the present invention can be substantially less tacky, and the apparatus 10 can provide sufficient support to the charge 14 throughout the various operations of manufacture so that the layers are not separated from one another despite the low level of tack. For example, the material of the charge 14 can have a tack level that is between about 0.1 lbs/in and 1 lb/in, as measured by the force required to pull the material (at standard atmospheric conditions) from an AccuTack™ tack tester available from Thwing-Albert Instrument Company of Philadelphia, Pa. One such low-tack material can be formed of Toray® 3900 series resin from Toray Industries Inc. of Tokyo, Japan, which can be used in combination with a reinforcement material such as carbon or glass fiber. In addition, the apparatus 10 can improve the levels of tackiness between plies as the material is formed. This improved tackiness is sufficient to hold the layers together and maintain the formed shape.

The charge 14 is typically a substantially flat member that is uncured. Thus, the charge 14 can be formed to the desired shape of the structural member 12 by pressure, with or without heating the charge 14. The structural member 12 according to the present invention can define various contours and configurations including curves, angles, flanges, complex contours, and the like. In particular, the structural members 12 can define stringers or other long members having a cross-sectional profile that is uniform or nonuniform along the length of the member. According to one embodiment of the present invention, shown in FIG. 12, the structural member 12 is a hat-shaped member, i.e., a member that includes a curved or angled portion 16 defining a slot or channel 18 along a longitudinal direction, and transverse flanges 20, tabs 22, or other features extending transversely outward from the curved or angled portion 16. The structural members 12 can be used in a variety of industries and applications including, but not limited, in connection with the manufacture of aircraft and other aerospace structures and vehicles. Further, the structural members 12 can be used individually or in combination with other structures and devices. In particular, after the structural member 12 has been formed, the member 12 can be used in a fuselage section of an airplane structure. For example, before or after each structural member 12 is cured, one or more of the members 12 can be loaded onto a mandrel of a machine for making a fuselage section. Fiber-reinforced resin can be disposed over the member(s) 12, and the fiber-reinforced resin can then be cured (or co-cured with the structural members 12) to produce a finished assembly for an airplane fuselage.

Referring again to the embodiment of FIG. 1, the illustrated forming apparatus 10 includes a frame 24 for supporting first and second dies 26, 28 for forming the charge 14. The first die 26 includes first and second portions 30, 32 that are supported by a tray 34. The second die 28 is configured to be adjusted toward the first die 26 for forming the charge 14 to the desired shape.

Figure 2:
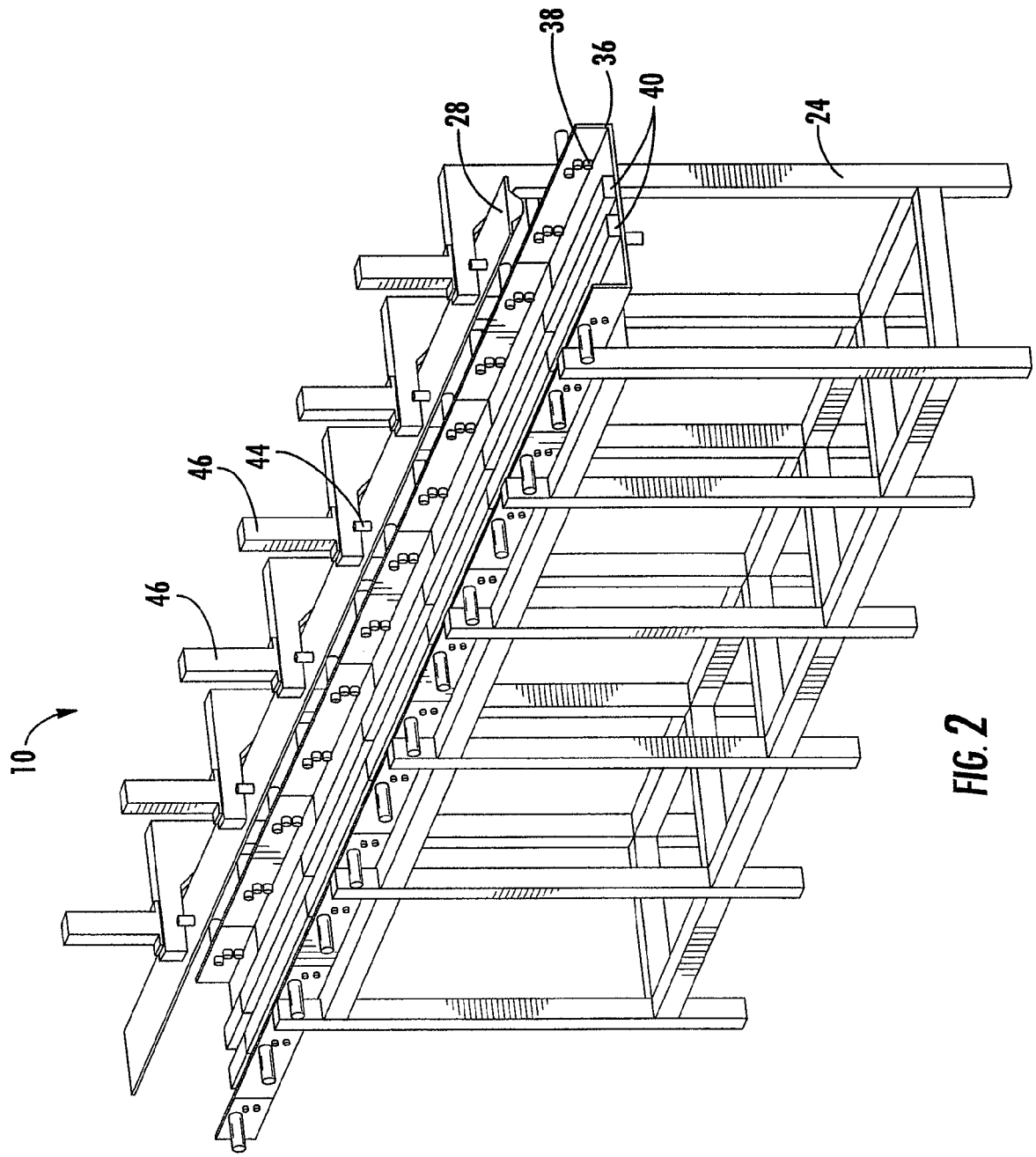
FIG. 2 is a perspective view illustrating the support frame of the apparatus of FIG. 1.
Figure 3:
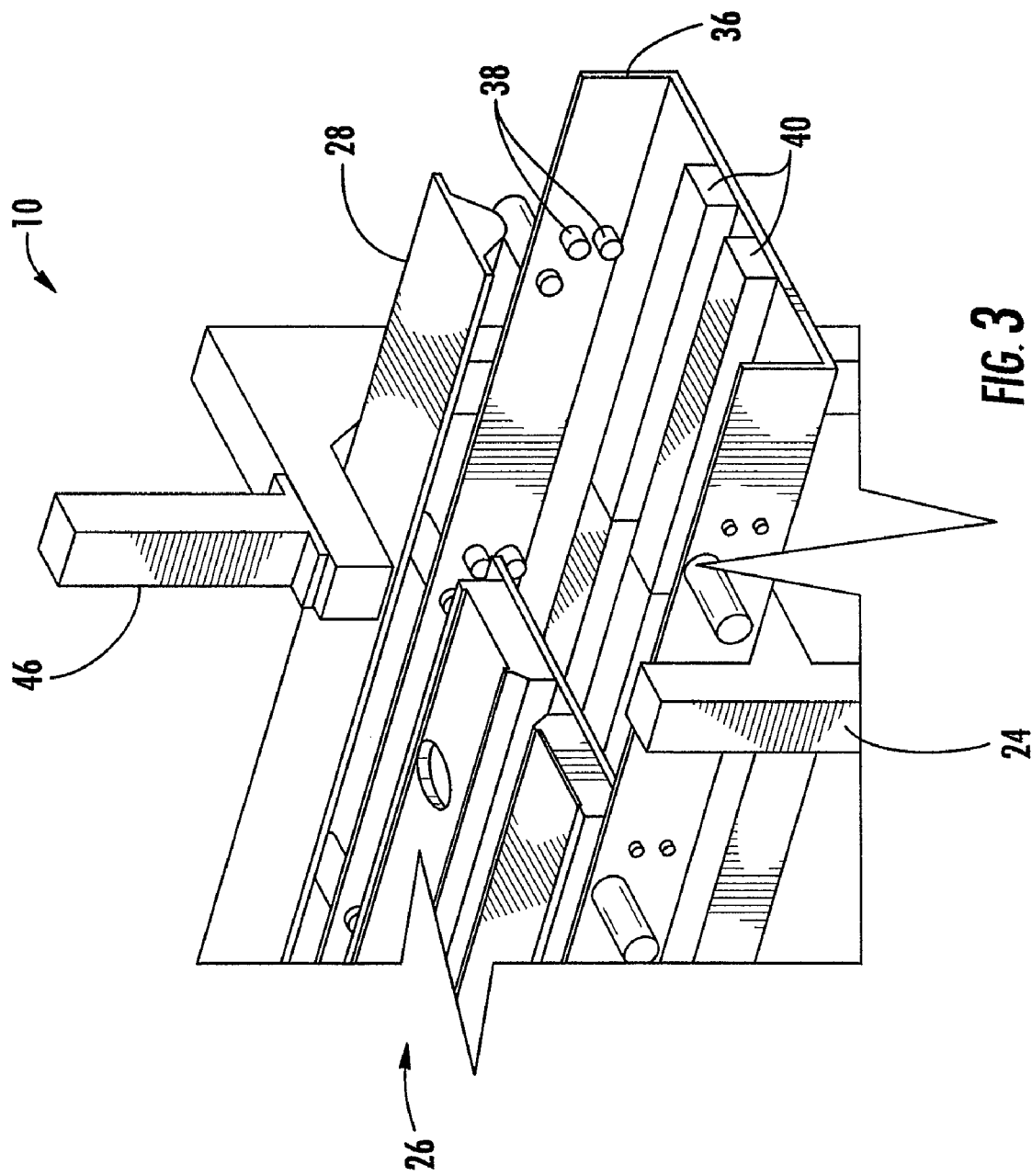
FIG. 3 is a partial perspective view illustrating a portion of the apparatus of FIG. 1.

The tray 34 and the first die 26 can be inserted into and removed from the frame 24 of the apparatus 10. In particular, as shown in FIGS. 2-3, the frame 24 can include a channel 36 for receiving the tray 34. The channel 36 can include a plurality of rollers 38 extending inward from the walls of the channel 36 for supporting the tray 34. That is, the rollers 38 can be arranged in pairs so that the tray 34 can be inserted between each pair of rollers 38 to thereby restrict the movement of the tray 34 through the frame 24 to the longitudinal direction. The channel 36 can also include guides 40 for contacting the bottom of the tray 34 to maintain the tray 34, and hence the first die 26, in the desired configuration. The tray 34 can be inserted into the channel 36 and, after the charge 14 on the first die 26 has been formed, the tray 34 can be removed with the first die 26 and the formed charge 14 disposed on the tray 34. For example, the tray 34 can be inserted into the channel 36 in a first direction parallel to the longitudinal direction of the tray 34 and subsequently removed from the channel 36 in the same direction or an opposite direction. Alternatively, in other embodiments of the present invention, the tray 34 can be inserted and/or removed in other directions, such as directions transverse to the longitudinal direction of the tray 34 and dies 26, 28.

With the tray 34 positioned in the channel 36, the first die 26 can be supported by the frame 24, and the charge 14 can be positioned between the first and second dies 26, 28. In this regard, the charge 14 can be disposed on the first die 26 before or after insertion of the die into the frame 24 of the apparatus 10. According to one embodiment of the present invention, the charge 14 can be formed on the first die 26, e.g., by separately disposing a plurality of layers or plies of the composite material to lay-up the charge 14 directly on the first die 26. In this way, the plies or other members of the charge 14 can be positioned relative to the first die 26 so that the charge 14 is indexed relative to the first die 26. For example, if some of the plies of the charge 14 are to extend only partially along the charge 14, the ends of the plies, or "ply drops," can be positioned accurately relative to the first die 26. Further, if the charge 14 is to define features that are formed or disposed prior to forming, those features can be indexed relative to the first die 26. For example, edges, apertures, thickened or thinned portions, embedded fasteners, supports, or other features of the charge 14 can be positioned accurately relative to the first die 26. The first die 26 can then be indexed during forming and/or other processing. In this way, the charge 14 can be indexed once to the die 26, and the die 26 can then be indexed relative to other devices for processing so that the charge 14 is accurately positioned without having to index the charge 14 directly for each process.

Figure 4:
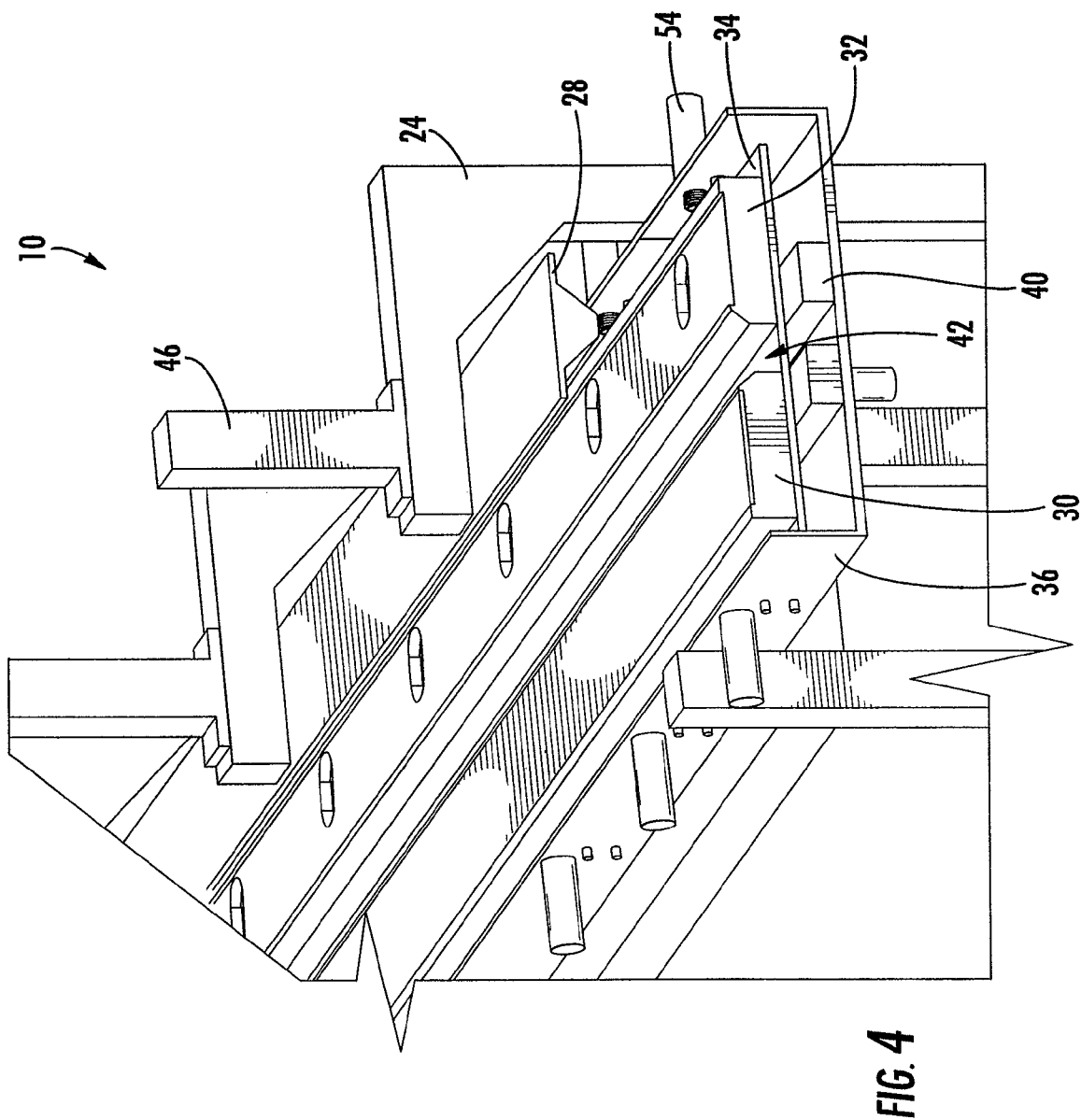
FIG. 4 is a partial perspective view illustrating a portion of the apparatus of FIG. 1.

As shown in FIGS. 4 and 5, the first and second longitudinal portions 30, 32 of the first die 26 are configured in a substantially parallel configuration to define a slot or recess 42 between the portions 30, 32. Each of the portions 30, 32 of the first die 26 is adjustable in a transverse direction so that the recess 42 can be opened or closed by moving the portions 30, 32 outward or inward, respectively. With the portions 30, 32 of the first die 26 adjusted outward to a first or open position, the recess 42 can be large enough to at least partially receive the second die 28. With the portions 30, 32 of the first die 26 adjusted inward to a second or closed position, the recess 42 can be smaller than the second die 28. In some cases, the portions 30, 32 of the first die 26 can contact each other in the closed position.

Figure 6:
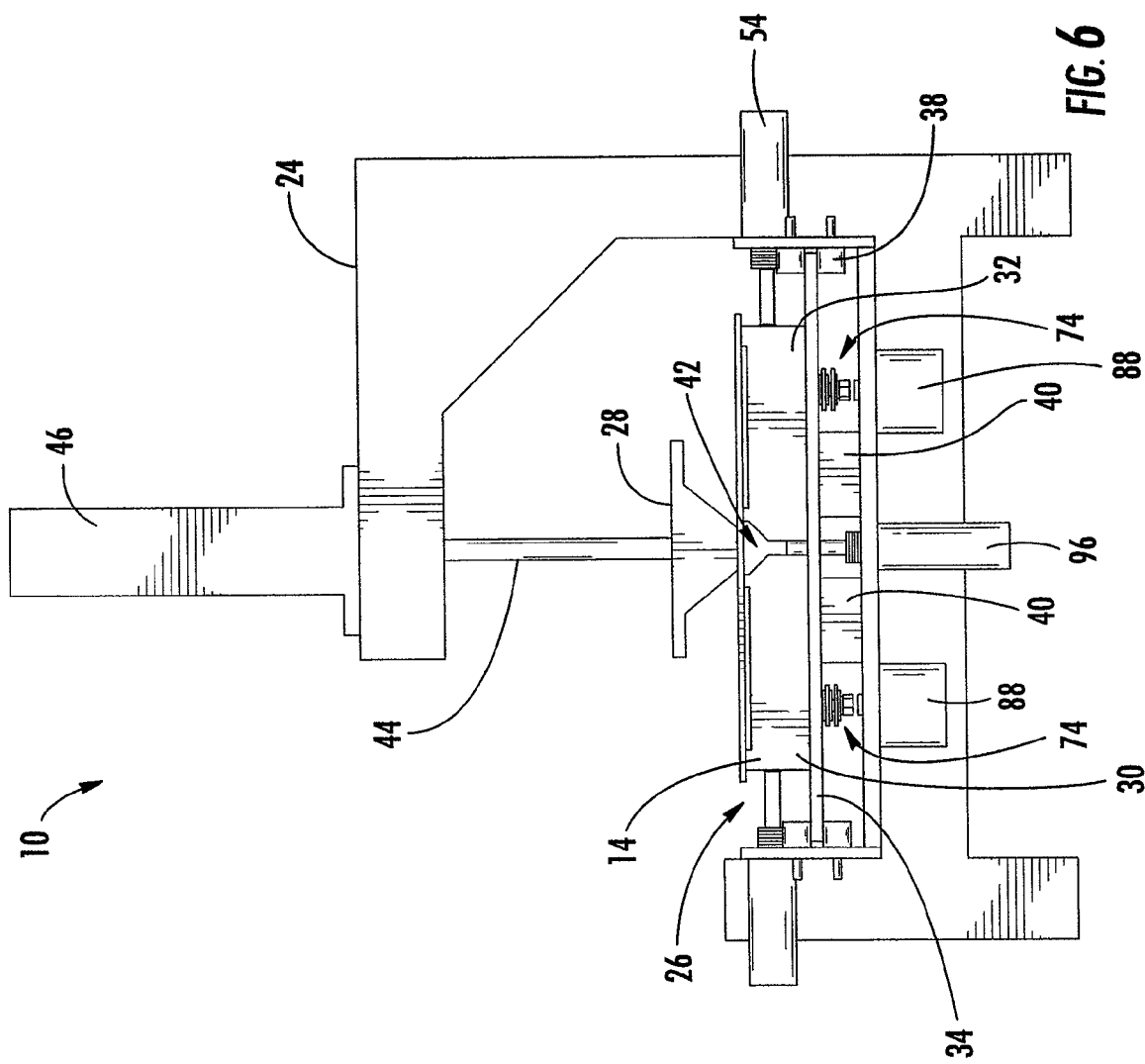
FIG. 6-8 are elevation views illustrating the apparatus of FIG. 1, shown with the second die in successively extended positions.

The second die 28 is configured to be urged toward the first die 26 so that the charge 14 can be formed between the dies 26, 28. For example, as shown in FIG. 6, the second die 28 can be connected to shafts 44 that are extended or retracted by a plurality of actuator devices 46, such as hydraulic, pneumatic, or electric actuators. The second die 28 typically defines a contour that corresponds at least partially to the contour of the first die 26. For example, the second die 28 can define a tapered or wedge-like portion 48 that corresponds to tapered or angled surfaces 50 defined by each of the portions 30, 32 of the first die 26. Further, the second die 28 can define flanges or stops 52 that extend outward on either side of the tapered portion 48.

In some cases, the second die 28 can define a contour such as a ridge or slot 29 (FIGS. 13A-13C) that imparts a contour in the charge 14 during forming. For example, the slot 29 can extend longitudinally along the length of the second die 28, and the charge 14 can be formed to define a contour that includes a channel- or slot-shaped feature that corresponds to the slot 29 in the second die 28. For example, the pinch actuators 96 can be used to bias the material of the charge 14 into the slot 29. In this way, various contours or features can be formed in the charge 14. In some cases, the contours or features can remain in the structural member 12 that is formed from the charge 14. Alternatively, however, such contours or features that are imparted into the charge 14 can be removed before the structural member 12 is fully formed, e.g., during curing of the charge 14. In this regard, the temporary formation of such contours or features in the charge 14 can reduce stress in the charge 14 during forming and improve the dimensional accuracy of the finished structural member 12, e.g., by providing additional material throughout the charge 14 as may be required if the materials of the charge 14 "debulk" or otherwise contract during curing, such as typically occurs when carbon fiber composite material is cured from a green condition. In any case, the second die 28 can be readily replaceable, e.g., by removing a pin 45a that connects a t-nut or bobbin 45b of the die 28 to the shaft 44, so that dies of various configurations can be used with the apparatus 10.

Figure 7:
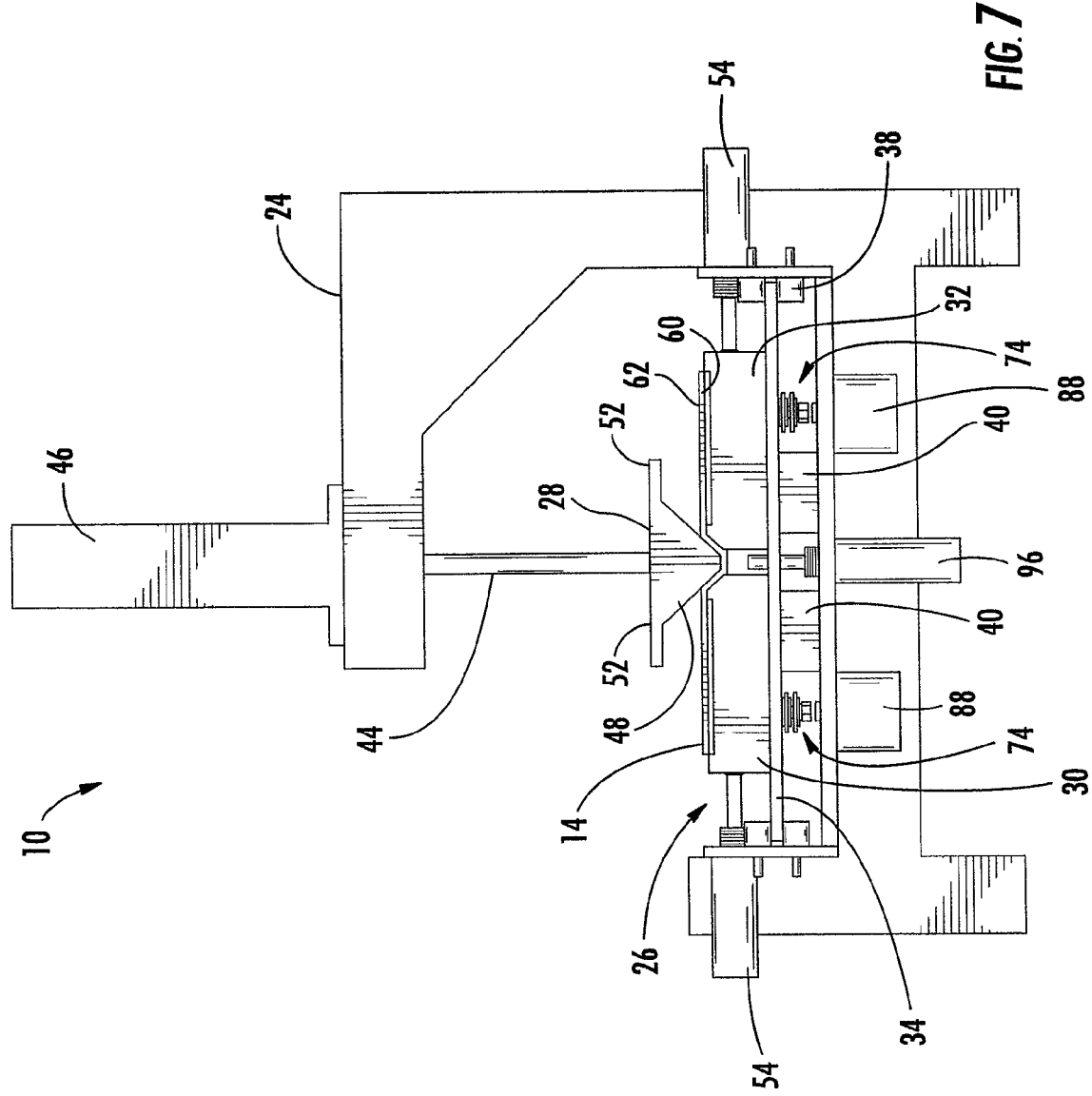

The apparatus 10 can also include motion control devices 54 along the length of the apparatus 10 that are configured to control the transverse position of each portion 30, 32 of the first die 26. As shown in FIG. 6, each of the motion control devices 54 can be extended to the first die 26 so that the opening of the first die 26 is controlled by the devices 54. Thus, the devices 54 can oppose the outward motion of the first die 26 and, hence, the extension of the second die 28 into the recess 42 between the portions 30, 32 of the first die 26. In other words, as shown in FIG. 7, the extension of the second die 28 into the recess 42 tends to adjust the portions 30, 32 of the first die 26 outward; however, the outward motion can be controlled by the control devices 54, thereby increasing the pressure exerted on the charge 14 between the two dies 26, 28, the speed of the forming process, the extent of motion of the dies 26, 28, and/or other aspects of the forming operation. Each control device 54 can be any of various types of actuator or other motion controller. For example, each control device 54 can be an active device such as a solenoid, stepper motor, other electric actuator, a hydraulically or pneumatically controlled cylinder, or the like. Alternatively, each control device 54 can be a generally passive device such as a mechanical spring, a passive hydraulic or pneumatic cylinder, or the like. In any case, the control devices 54 can slow or stop the motion of the portions 30, 32 of the first die 26, e.g., to maintain a minimum predetermined pressure between the dies 26, 28 during forming. In some cases, the force exerted on the charge 14 between the dies 26, 28 can be monitored by a monitoring device, such as a load cell 33 (illustrated in FIGS. 13A-13C), which is typically an electronic transducer that provide an electronic signal indicative of the forming force.

Further, each of the control devices 54 can be independently adjusted so that the position of the portions 30, 32 of the first die 26 is selectively determined independently along the length of the apparatus 10. In this regard, one or both of the dies 26, 28 can be formed of materials that are generally incompressible and rigid but allow some flexibility. For example, each of the dies 26, 28 can be formed of a polymer such as high density polyethylene (HDPE) or the like. By virtue of this flexibility, the dies 26, 28 can be urged to a slightly nonlinear configuration to conform to nonuniformities along the length of the charge 14. For example, if the charge 14 defines variations in thickness along its length, the portions 30, 32 of the first die 26 may be pushed outward to a greater extent where the charge 14 is thickest, while the portions 30, 32 are pushed outward to a lesser extent where the charge 14 is thinner. The portions 30, 32 of the first die 26 may also be adjusted by nonuniform amounts to accommodate other features, such as nonuniformities or nonlinearity of the second die 28, and the like.

Figure 8:
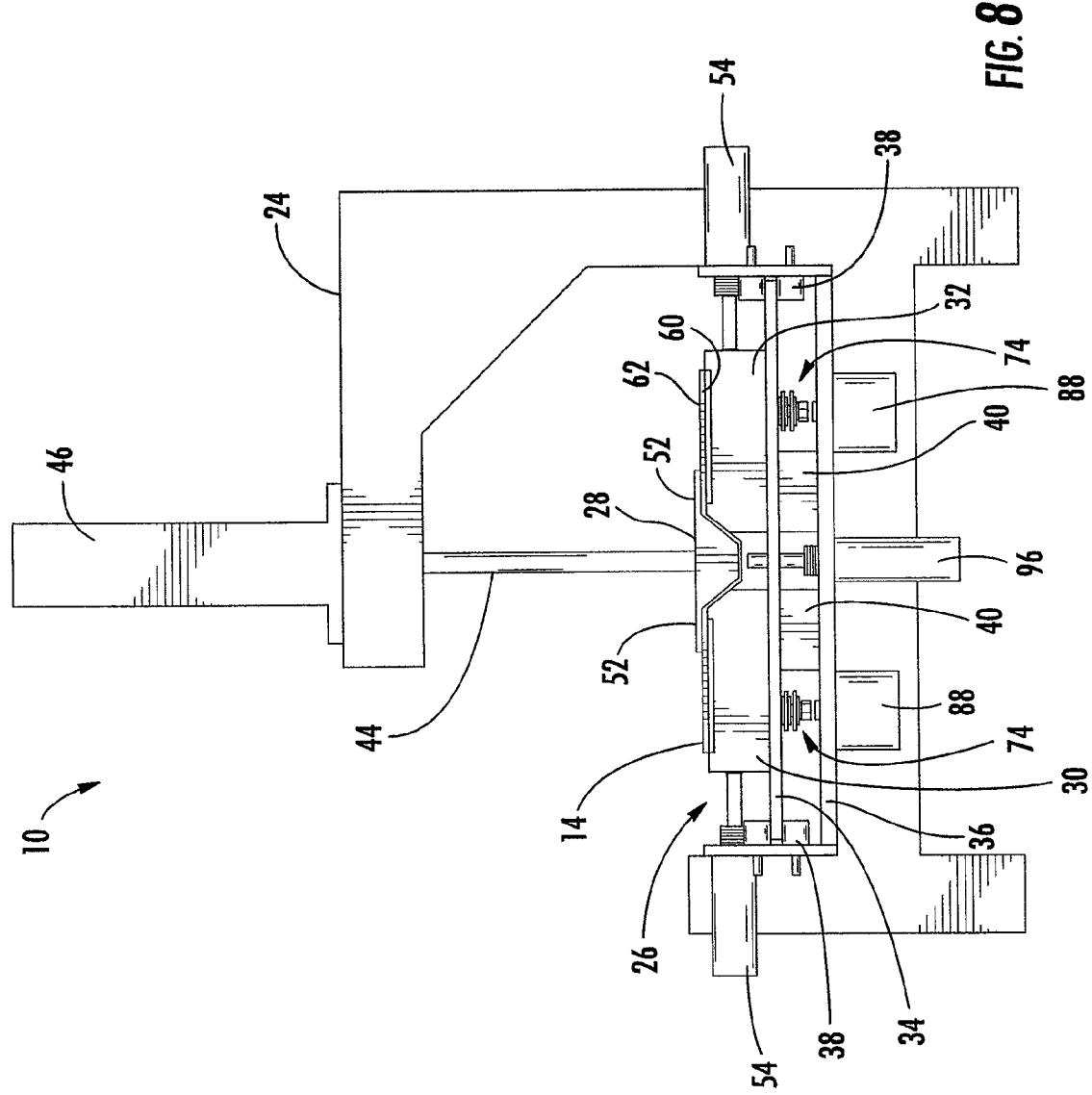

The second die 28 is extended by the plurality of actuators 46 toward the first die 26 until the charge 14 is formed to a predetermined configuration, thereby urging the portions 30, 32 of the first die 26 outward. As shown in FIG. 8, the tapered portion 48 of the second die 28 can be completely inserted into the recess 42 between the portions 30, 32 of the first die 26, and the flanges 52 defined by the second die 28 can be urged toward the first die 26 to prevent further insertion of the second die 28 into the recess 42 and prevent further urging of the first die 26 outward by the second die 28. That is, the flanges 52 of the second die 28 can act as a stop to prevent further forming of the charge 14. In some cases, the second die 28 can be formed of a material that is at least slightly flexible, and the actuators can extend to slightly different positions so that the second die 28 is disposed against the charge 14 in a nonlinear configuration relative to the initial configuration of the second die 28. Thus, the second die 28 can be flexed to conform to variations in the charge 14, the first die 26, or otherwise.

According to one embodiment of the present invention, the separation of the portions 30, 32 of the first die 26 during forming puts the charge 14 in tension. More particularly, both a first surface 60 directed toward the first die 26 and a second surface 62 directed toward the second die 28 can be subjected to tension during the forming operation, instead of compressive stress that might otherwise occur at the first surface 60 of the charge 14 if the portions 30, 32 of the first die 26 remained stationary in the open configuration throughout the entire forming operation. Although the present invention is not meant to be limited to any particular theory of operation, it is believed that maintaining the charge 14 in tension during the forming operation can reduce or eliminate the occurrence of wrinkling in the charge 14.

Figure 9:
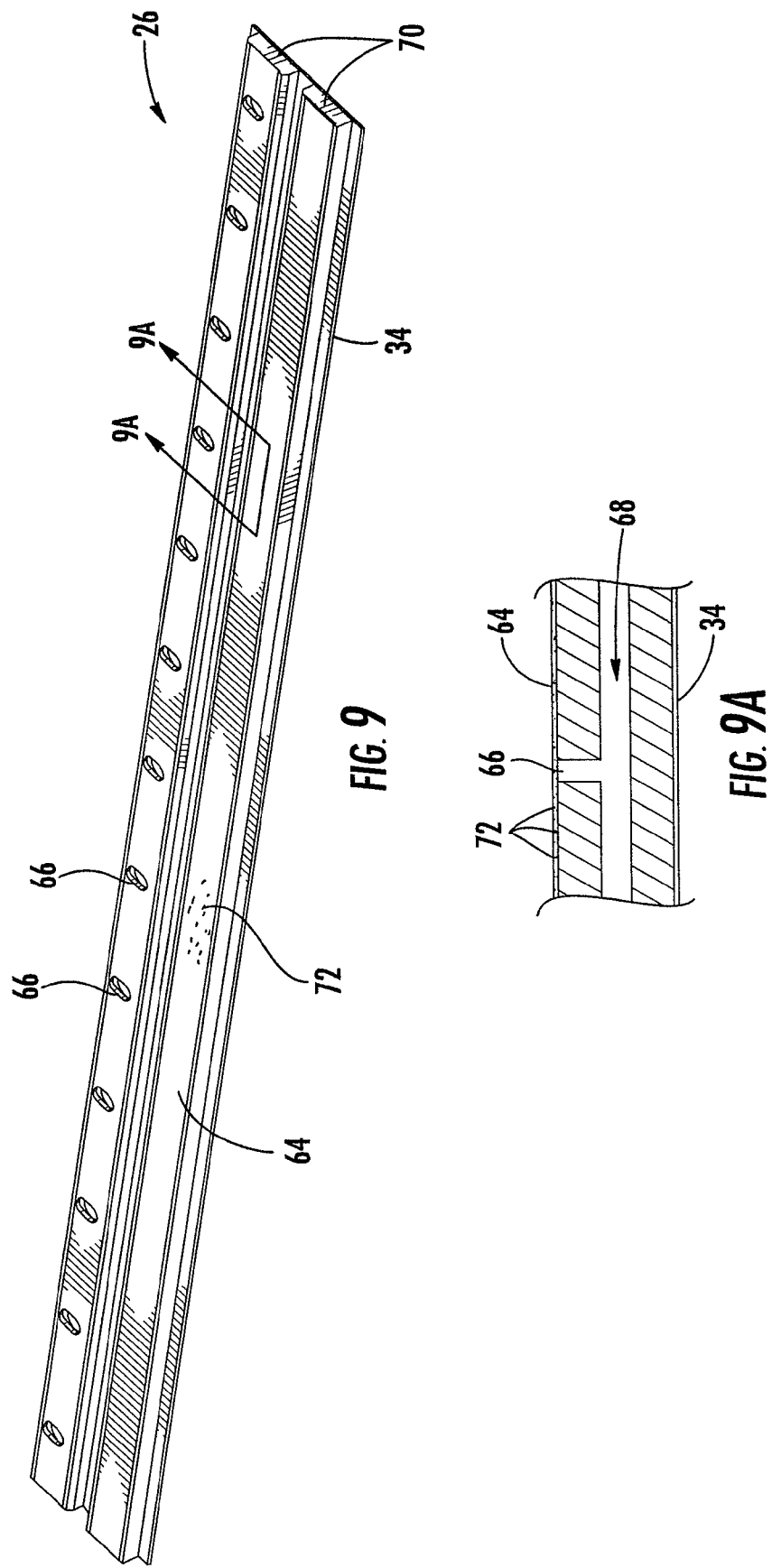
FIG. 9 is a perspective view illustrating the support tray and first die of the apparatus of FIG. 1.

In some cases, the charge 14 can be retained by and/or against the first die 26 during forming. For example, FIG. 9 illustrates the tray 34 and the portions 30, 32 of the first die 26 according to one embodiment of the present invention. The first portion 30 of the first die 26 is shown in its assembled configuration with a perforated cover sheet 64, and the second portion 32 of the first die 26 is shown without the perforated cover sheet 64 only for purposes of illustrative clarity. Each portion 30, 32 defines a plurality of apertures 66 for evacuating gas from the surface of the respective portion 30, 32 upon which the charge 14 is disposed during forming. Thus, the charge 14 can be restrained by a partial vacuum formed between the charge 14 and each portion 30, 32. The apertures 66 can connect to one or more internal chambers 68 (FIG. 9A) extending longitudinally along each portion 30, 32, each chamber 68 being maintained at a low pressure by a gas evacuation device 70 configured to evacuate gas from the chambers 68. Each perforated cover sheet 64 can define a plurality of relatively small apertures 72 such that ambient air is drawn in through the entire cover sheet 64, thereby restraining the charge 14 to the cover sheets 64 and, hence, the portions 30, 32 of the first die 26. For example, the cover sheets 64 can be formed of a porous Vyon® sheet, registered trademark of Porvair of Norfolk, England.

Figure 10:
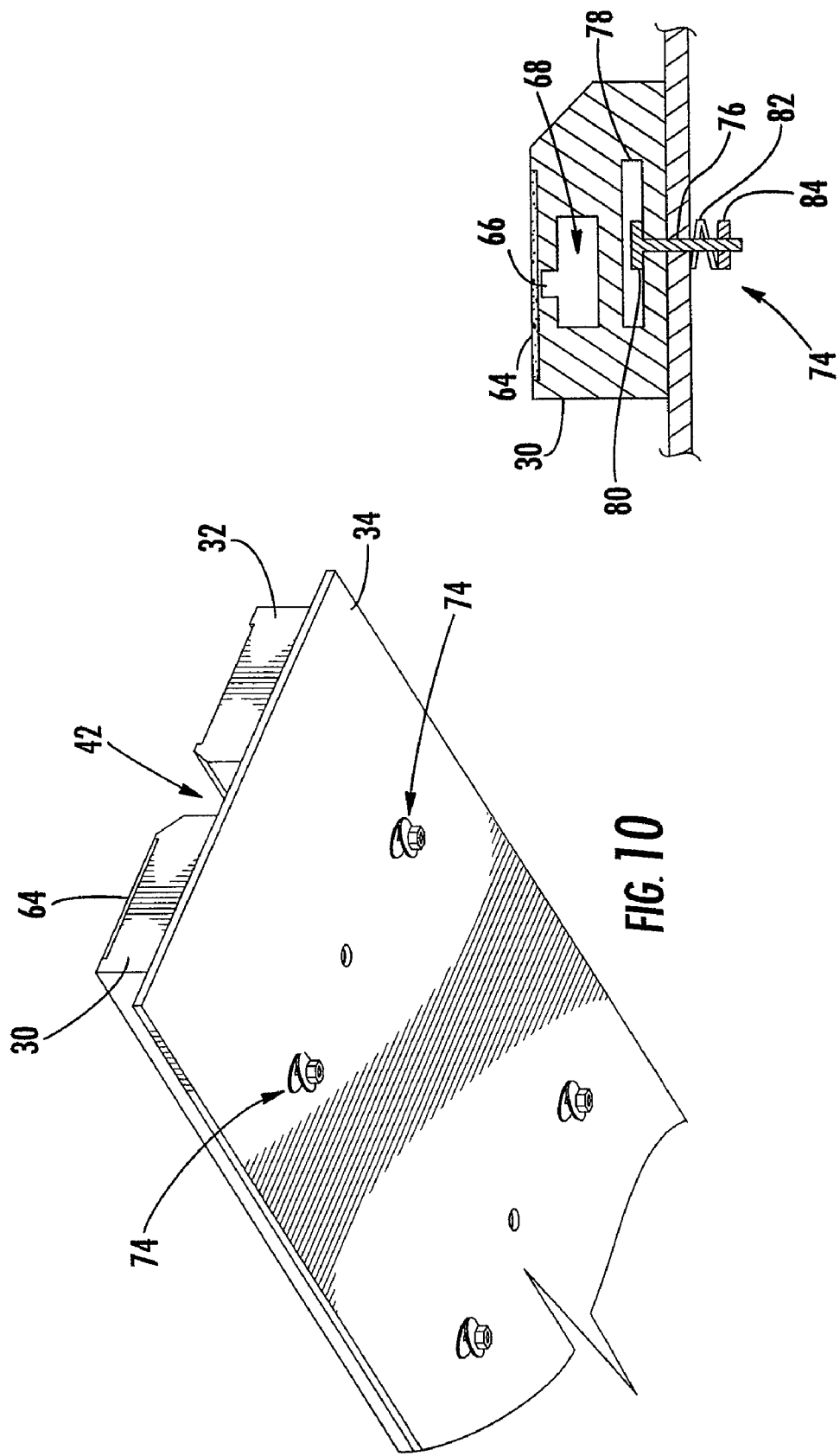
FIG. 10 is a partial perspective view illustrating the support tray and first die of the apparatus of FIG. 1.

The apparatus 10 can also be configured to secure the portions 30, 32 of the first die 26 in a particular position. For example, if the portions 30, 32 are urged outward by nonuniform distances at different points along the apparatus 10, e.g., to define a nonlinear configuration of the portions 30, 32, the portions 30, 32 can be locked in that position. With the first die 26 locked in the desired configuration of the charge 14, the first die 26 can be removed from the frame 24 so that the first die 26 supports the charge 14 in the desired configuration during subsequent processing. For example, as illustrated in FIGS. 8 and 10, each portion 30, 32 of the first die 26 can be connected to the tray 34 by a plurality of locking devices 74. In the illustrated embodiment, each locking device 74 includes a bolt 76 that extends through the tray 34. Each bolt 76 extends through a slot 78 (FIG. 10A) in the portion 30, 32 such that the portions 30, 32 are secured to the tray 34 by a head 80 of each bolt 76 disposed opposite the slot 78 from the tray 34 and each portion 30, 32 is slidably adjustable relative to the bolts 76. That is, with the bolts 76 remaining stationary in holes defined through the tray 34, each portion 30, 32 can be adjusted inward and outward to close or open the recess 42 between the portions 30, 32. A spring 82 is provided on each bolt 76 between the tray 34 and a nut 84 on the bolt 76. The spring 82, which can be, e.g., a disc or Belleville spring, biases the nut 84 away from the tray 34, such that the head 80 of the bolt 76 biases the respective portion 30, 32 against the tray 34, thereby frictionally locking the portion 30, 32 to the tray 34. The locking devices 74 can be located at a plurality of locations along the length of each portion 30, 32 so that each portion 30, 32 can be independently secured in the desired configuration, which can include configurations in which each portion 30, 32 is flexed and/or nonlinear along its length. In operation, each locking devices 74 can be released by urging the nut 84 toward the tray 34 to overcome the spring force and release the frictional force between the respective portion 30, 32 and the tray 34. In fact, as shown in FIG. 8, the apparatus 10 can include actuators 88 configured to extend and push against the locking devices 74 to unlock each device 74 during forming. The actuators 88 can retract and release the locking devices 74 once the charge 14 is formed to the desired configuration so that the portions 30, 32 of the first die 26 are then locked in place, even if the tray 34 is removed from the frame 24.

Figure 11:
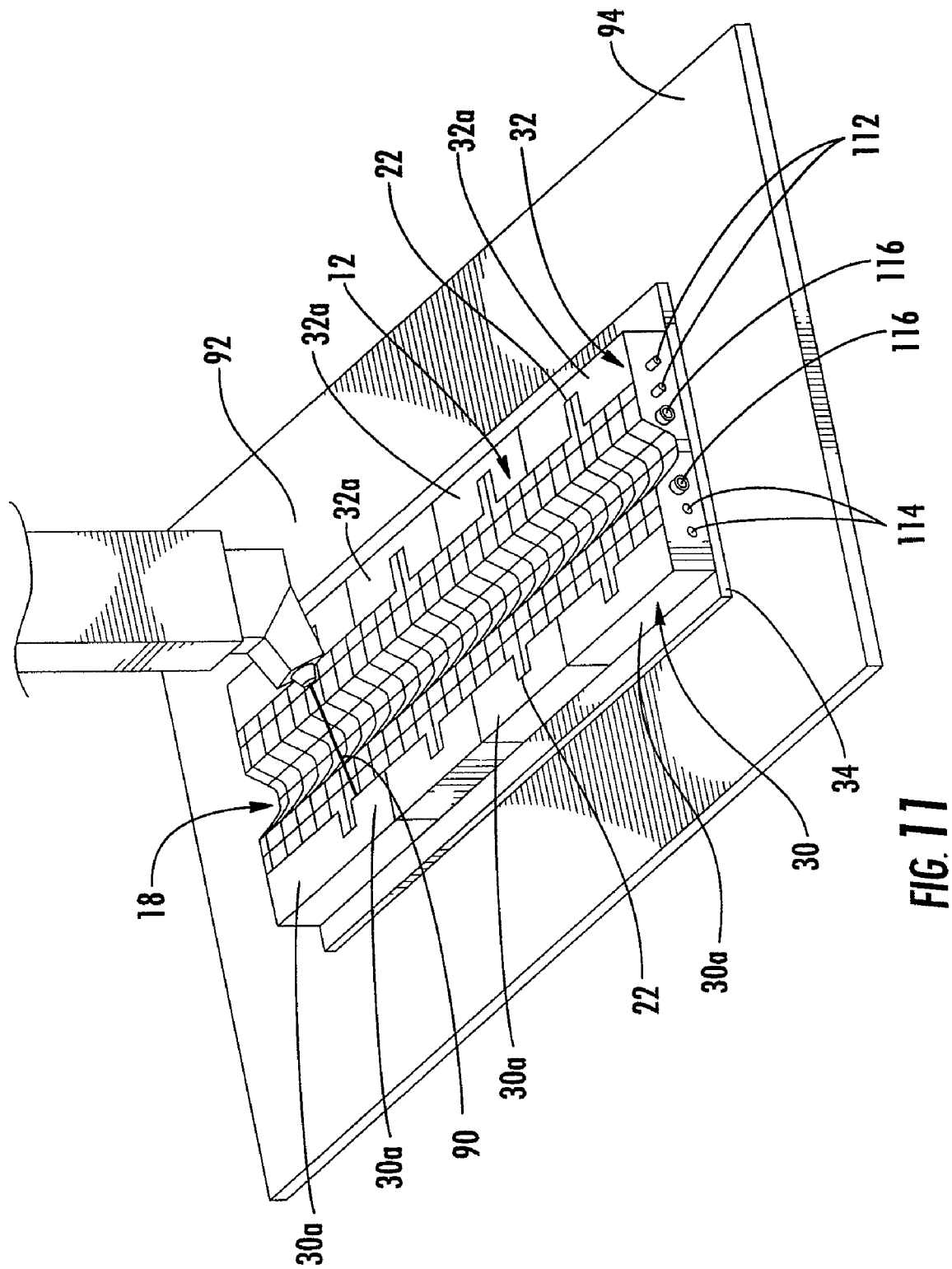
FIG. 11 is a perspective view illustrating the structural member during a trimming operation.

Thus, the structural member 12 can be removed from the apparatus 10 with the tray 34 and the first die 26 after forming. The tray 34 can then be delivered to a subsequent processing station for further processing of the structural member 12. Further, since the structural member 12 is indexed to the tray 34 and the first die 26, the tray 34 or first die 26 can be used for indexing the structural member 12 for subsequent operations. For example, the charge 14 can be further compressed and/or cured in the desired configuration while supported by the first die 26. In addition, as shown in FIG. 11, the structural member 12 can be trimmed, such as with an ultrasonically reciprocating knife blade 90 that is controlled by a multi-axis adjustable automated trimming head 92. The tray 34 can be indexed to a worktable 94 or other structure associated with the trimming head 92 so that the trimming head 92 can accurately trim the structural member 12 to a desired configuration without requiring that the structural member 12 be directly indexed again.

As also illustrated in FIG. 8, the apparatus 10 can include pinch actuators 96 that are configured to selectively extend or retract through holes 98 in the tray 34. In the extended position, each pinch actuator 96 can contact the charge 14, thereby biasing the charge 14 against the second die 28 and maintaining a position of the charge 14 relative to the second die 28 until the charge 14 is formed. An intermediary member, such as a longitudinal wedge, can be provided between the pinch actuators 96 and the charge 14 so that the charge 14 is held against the second die 28 along the entire length of the charge 14.

FIG. 13 illustrates another embodiment of the present invention in which the apparatus 10 defines restraints 100 for restraining a motion of the charge 14 relative to each of the portions 30, 32 of the first die 26. The restraints 100 can be bracket-like members that extend along the length of the portions 30, 32 of the first die 26 and at least partially restrain transverse edges 102, 104 of the charge 14. For example, the restraints 100 can define slots 106 for receiving the transverse edges 102, 104 of the charge 14 so that the edges 102, 104 are held against the portions 30, 32 of the die 26. The restraints 100 can be fixed devices or can be adjustable, i.e., to urge the charge 14 against the portions 30, 32 of the first die 26 and further constrain the charge 14. The illustrated restraints 100, or restraints of other configurations, can be used in combination with or instead of the evacuation device 70.

Figure 13A:
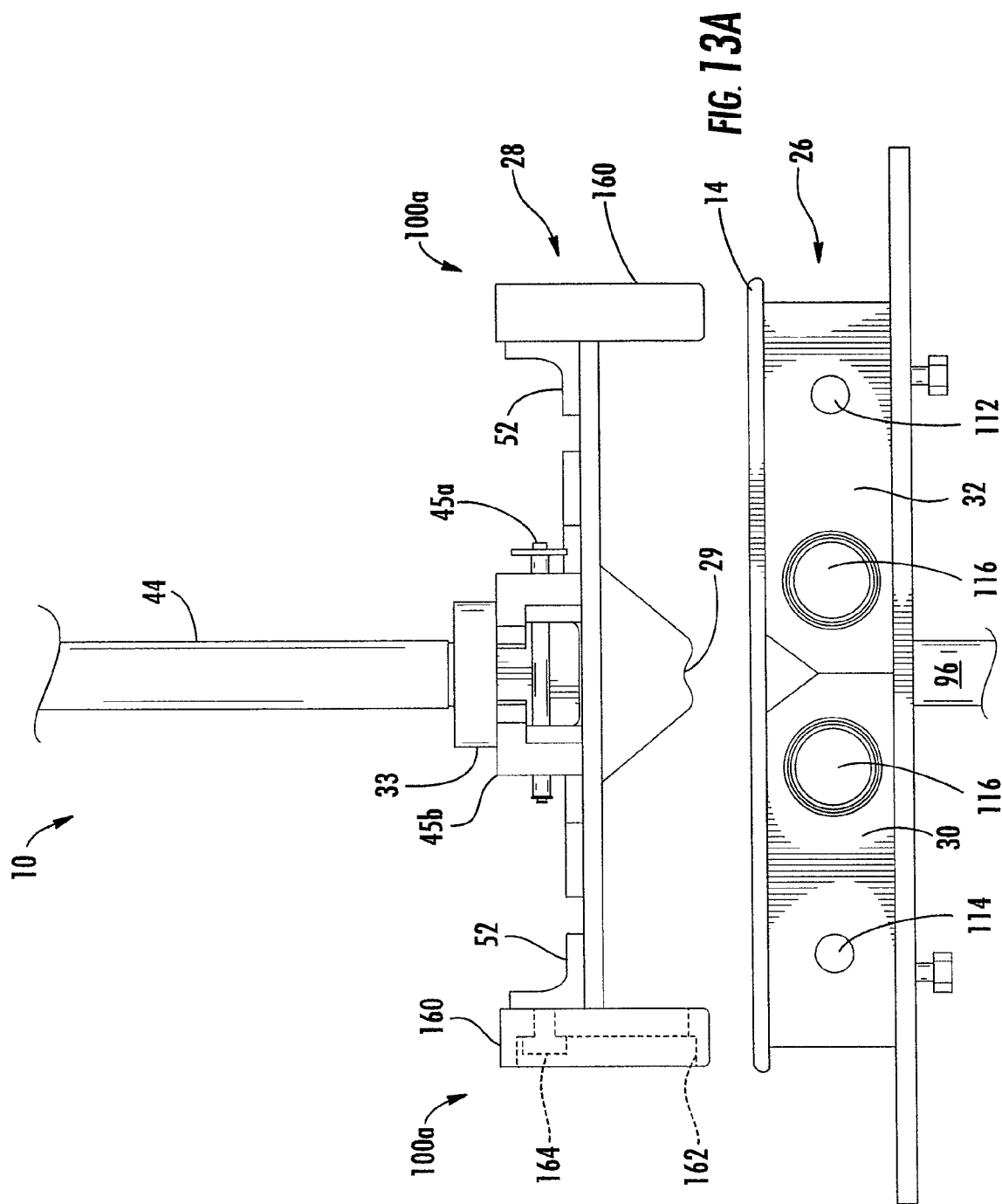
FIG. 13A is an elevation view illustrating an apparatus for forming a structural member according to another embodiment of the present invention, shown with the charge unformed.
Figure 13C:
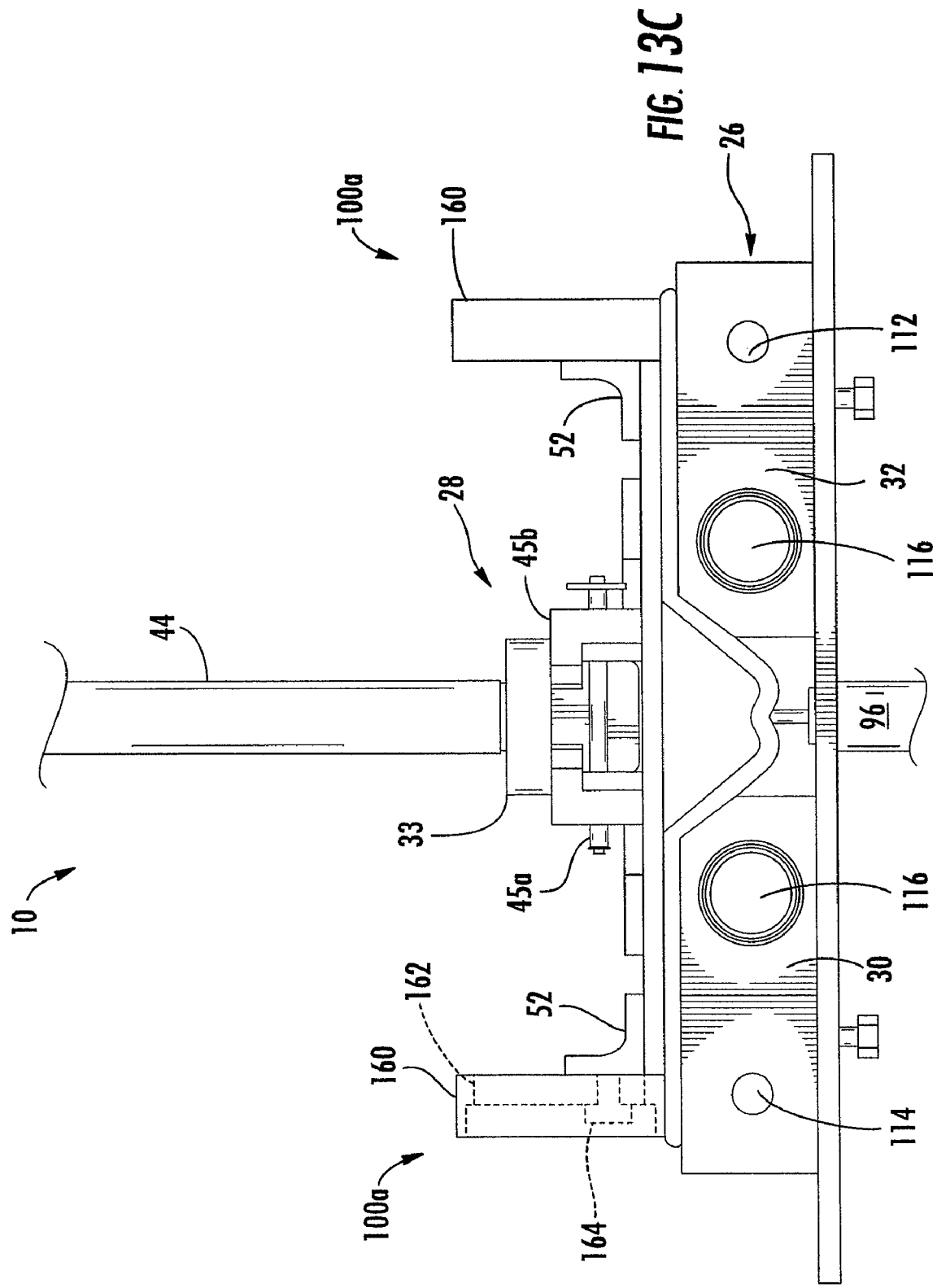
FIG. 13C is an elevation view illustrating the apparatus of FIG. 13A, shown with the charge fully formed.

The charge 14 can alternatively be secured or restrained during forming using a variety of other devices or methods. In some cases, restraining devices can be connected to the second die 28. For example, FIGS. 13A-13C show another exemplary embodiment of the present invention in which the second die 28 of the apparatus 10 includes adjustable restraints 100a. Each restraint 100a includes a weight member 160 that is adjustably connected to one of the flanges 52 of the second die 28. For example, the weight member 160 can define a slot 162 that receives a projection or pin 164 that extends from the respective flange 52, so that the weight member 160 can be adjusted relative to the second die 28, i.e., adjusted up and down relative to the flanges 52 as shown in FIGS. 13A-13C. Each weight member 160 can be biased toward the first die 26 as shown in FIG. 13A by the weight of the member 160 and/or by a bias member such as a spring. Thus, as the second die 28 is adjusted toward the first die 26, the weight members 160 can contact the charge 14 before the charge is significantly formed between the dies 26, 28. The weight members 160 can be sufficiently biased against the first die 26 so that the members 160 restrain the charge 14 during forming. In other embodiments of the present invention, the restraints 100a can be actively adjusted. For example, a motor or other actuator can be provided for adjusting the position of the restraints 100a. Further, the restraints can be formed of a flexible material such as rubber or polymer. In fact, in some cases, each restraint 100a can include an inflatable bladder that can be filled with gas and thereby expanded toward the charge 14 on the first die 26 to hold the charge 14 in place during forming.

The first die 26 of the apparatuses 10 illustrated in FIGS. 1-13 can be used for forming as well as subsequent processing of the structural members 12. Thus, the charge 14 can be disposed on the first die 26, the charge 14 can be processed in the apparatus 10, and the first die 26 can be removed from the apparatus 10 and further processed in another processing station or device. Thereafter, the structural member 12 can be removed from the first die 26, and the first die 26 can be re-used for forming another structural member 12. Of course, multiple first dies 26 can be utilized with the apparatus 10 so that the apparatus 10 can be operated even when one of the dies 26 is being used to support a charge 14 or structural member 12 outside the apparatus 10. In some cases, the multiple dies 26 can define different lengths, cross-sections, and the like for forming structural members 12 of different configurations.

Figure 13D:
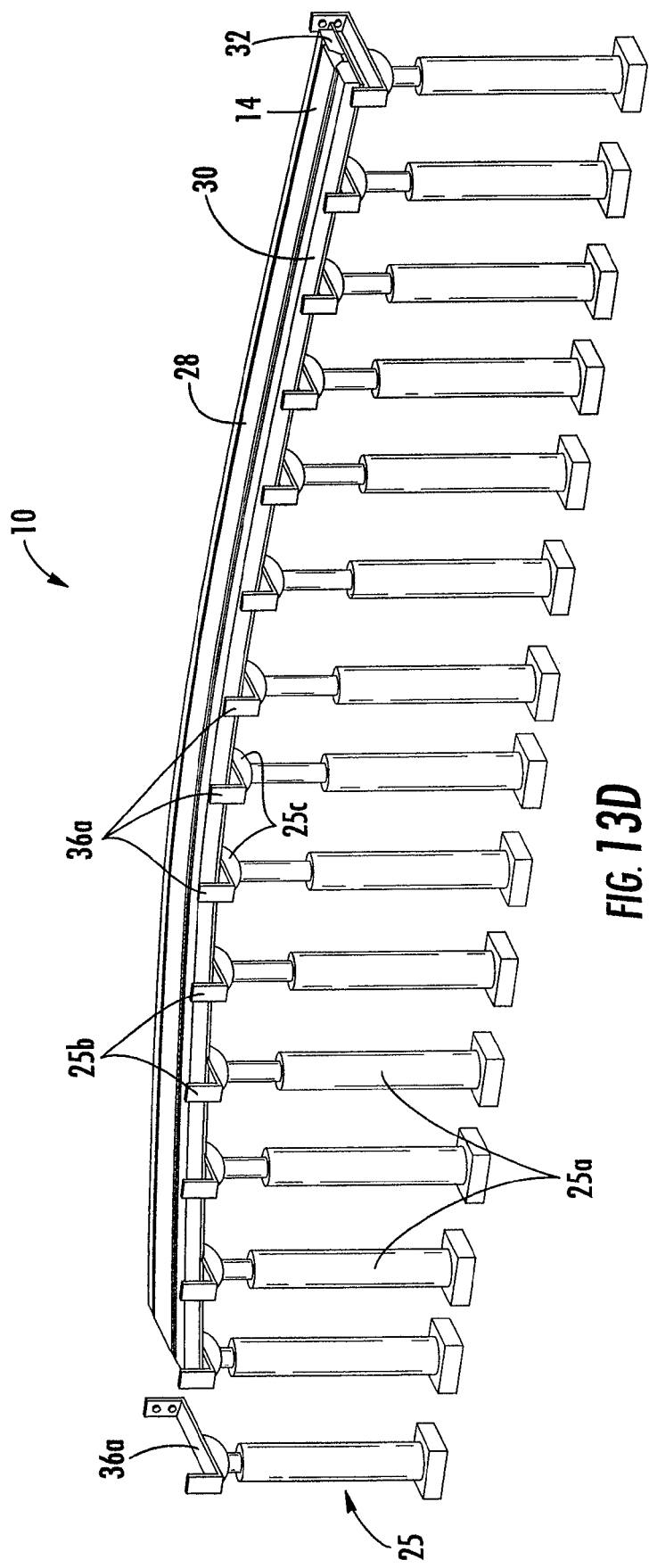
FIG. 13D is a perspective view illustrating an apparatus according to an embodiment of the present invention including pogos for supporting the dies.
Figure 13E:
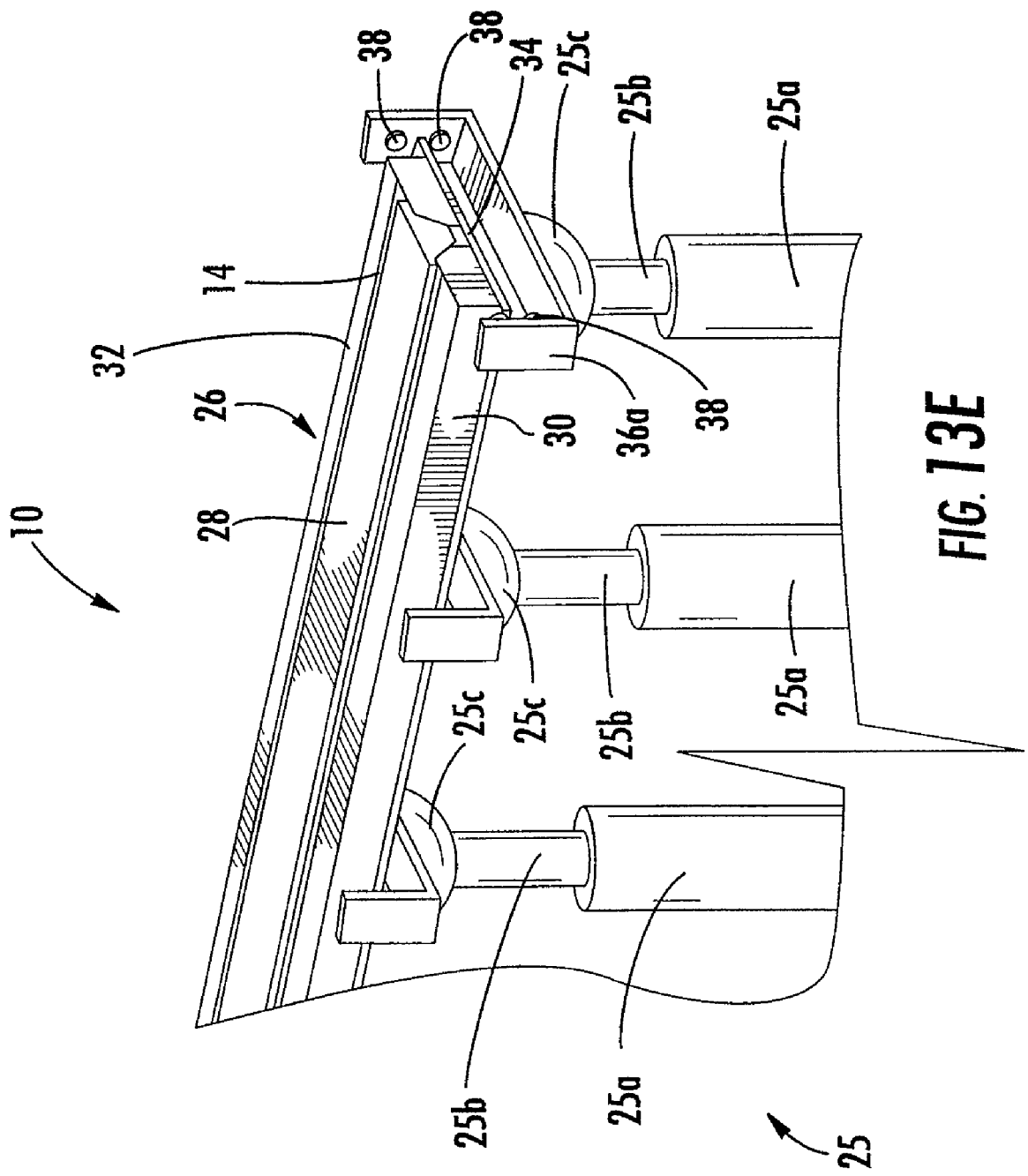
FIG. 13E is a partial perspective view illustrating a portion of FIG. 13D.

The first and/or second dies 26, 28 can be adjustable to define non-linear configurations, e.g., for forming the charge 14 to a configuration that is curved about one or more axes. In this regard, FIGS. 13D-13E illustrate that the frame 24 of the apparatus 10 can include adjustable support devices such as pogos 25, each of which typically includes an actuator 25a that can selectively extend and retract an actuation rod 25b. The actuation rods 25b of the pogos 25 can also be rotatably adjustable by virtue of a rotatable connection 25c so that the charge 14 can be supported in a curved, twisted, or otherwise three-dimensionally contoured configuration. Each rod 25b can support the dies 26, 28, e.g., via channel sections 36a that include rollers 38 arranged in pairs to define nips for receiving the tray 34 as similarly described above in connection with FIGS. 2 and 3. Thus, the pogos 25 can be adjusted to support the tray 34 and the first die 26 in a desired configuration, such that the charge 14 can be formed, cured, or otherwise processed in the desired configuration. The pogos 25 can form the frame 24 of the apparatus 10 that is used to support the tray 34 and the first die 26 while the charge 14 is formed using the second die 28. Alternatively, the pogos 25 can be used to support the tray 34, the first die 26, the charge 14, and the second die 28 during a separate forming operation that is performed before or after the forming of the charge 14 with the second die 28. Thus, the charge 14 can be formed to a generally nonlinear configuration defined by the configuration of the pogos 25, separately or in conjunction with the forming of the charge 14 between the first and second dies 26, 28.

Further, as shown, e.g., in FIG. 11, each portion 30, 32 of the first die 26 can include multiple segments 30a, 32a arranged longitudinally. Each segment 30a, 32a can be a modular device with connection features for connecting to the other segments 30a, 32a of the respective portion 30, 32. Thus, the first die 26 can be constructed using any number of the modular segments so that the first die 26 has a length corresponding to the length of the structural member 12 to be formed. The length of the die 26 can be adjusted so that the same modular segments 30a, 32a can be used for forming members 12 of different lengths. In particular, each modular segment 30a, 32a can define alignment rods 112 that extend from the segment for engaging corresponding alignment apertures 114 defined by an adjacent segment 30a, 32a. Further, if the first die 26 is configured to provide evacuation through a surface for constraining the charge 14, the internal chamber 68 of each modular segment 30a, 32a can be connected to the adjacent segments 30a, 32a via corresponding vacuum connections 116 at each end of the segment 30a, 32a. The vacuum connections 116 at the exposed ends of the modular segments 30a, 32a positioned at the ends of the assembled die 26 can be sealed with a cap or plate, or those vacuum connections 116 can be used for connecting to the evacuation device 70. Although not illustrated in FIG. 11, the evacuation device 70 can continue to operate to provide a vacuum in the chamber 68 of each portion 30, 32 of the first die 26 during operations subsequent to forming in the apparatus 10, such as during trimming by the trimming head 92.

Figure 14:
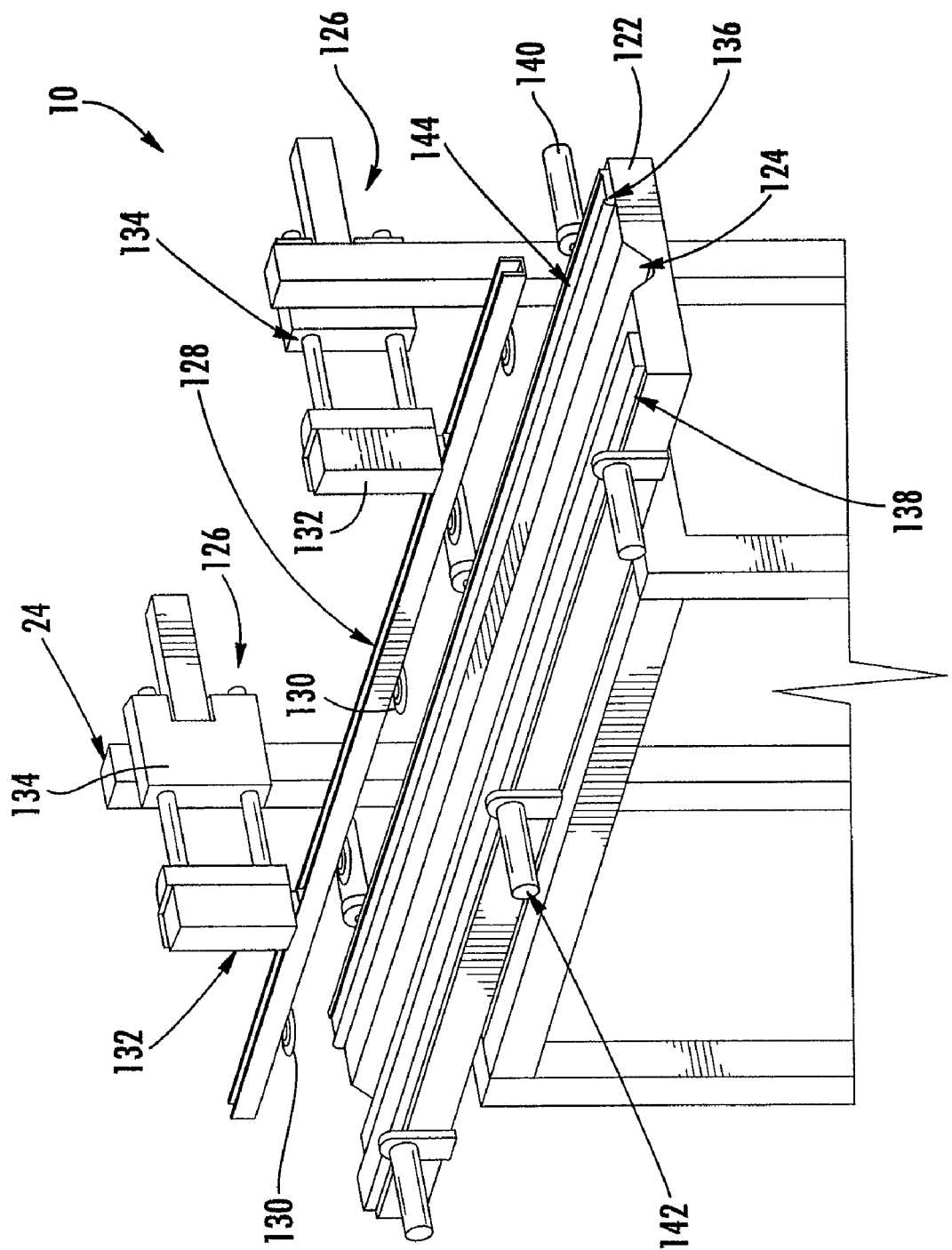
FIG. 14 is a perspective view illustrating an apparatus for forming a structural member according to yet another embodiment of the present invention.
Figure 15:
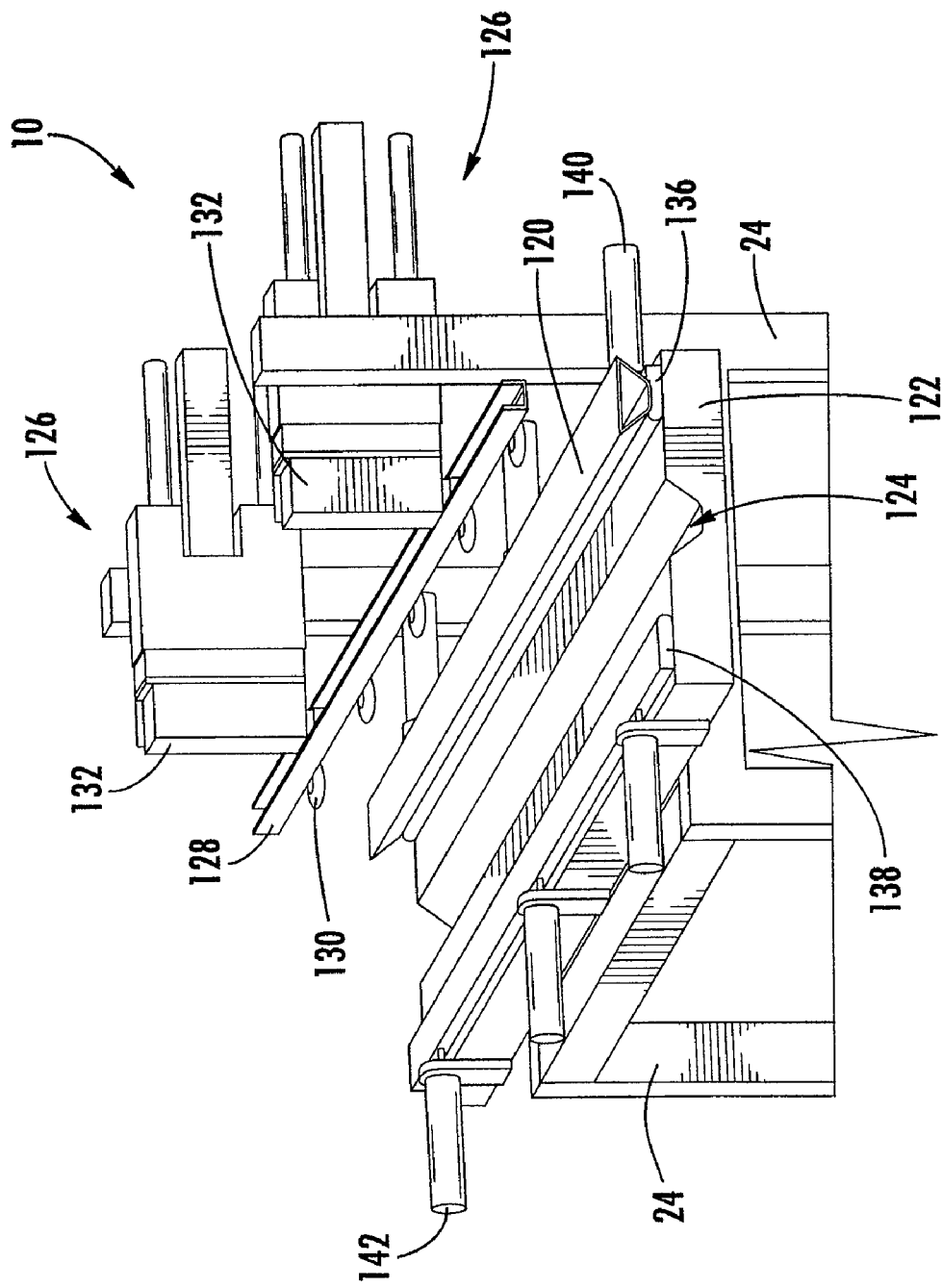
FIGS. 15-25 are perspective views illustrating the apparatus of FIG. 14 shown during various stages during a forming operation according to one embodiment of the present invention.
Figure 16:
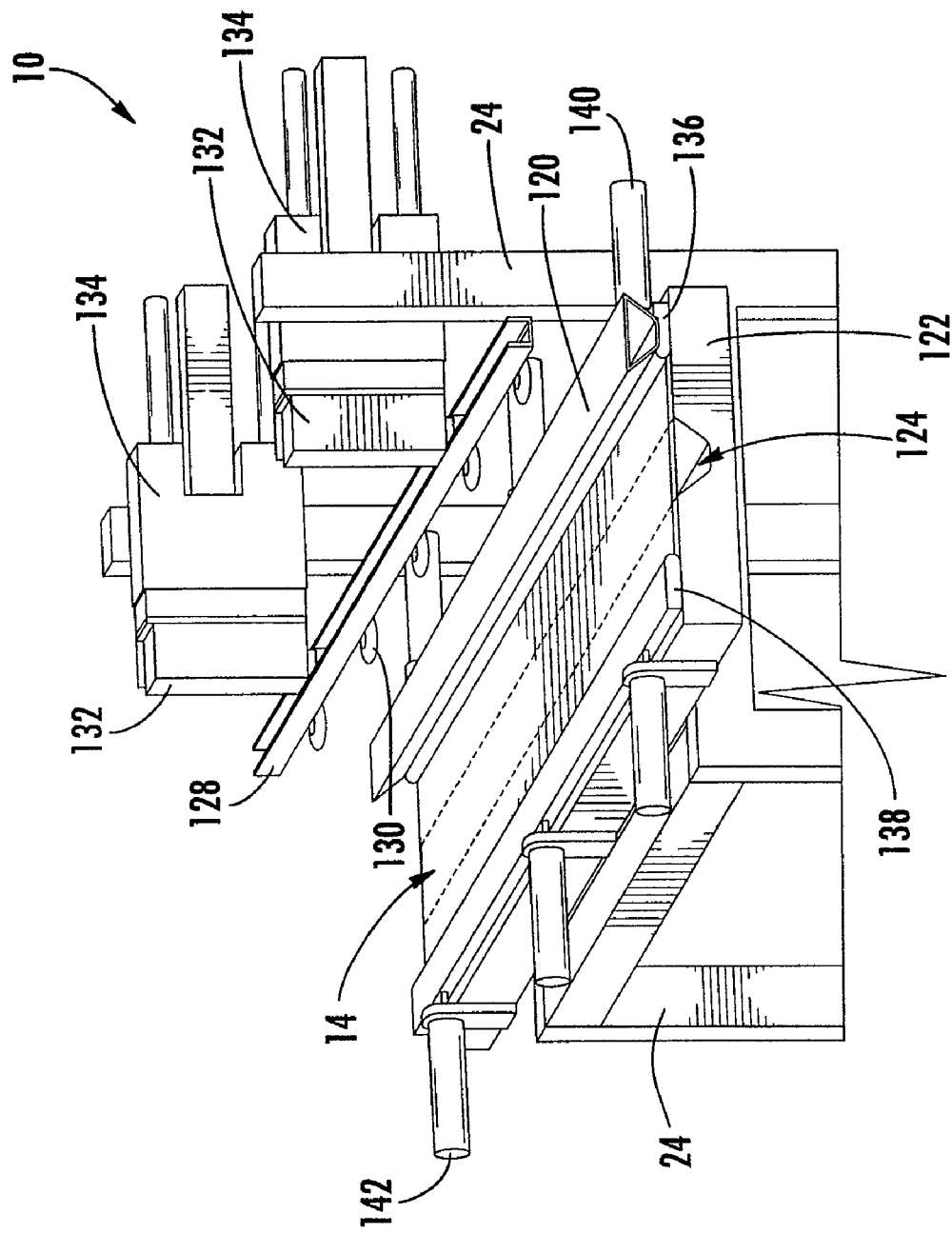
Figure 17:
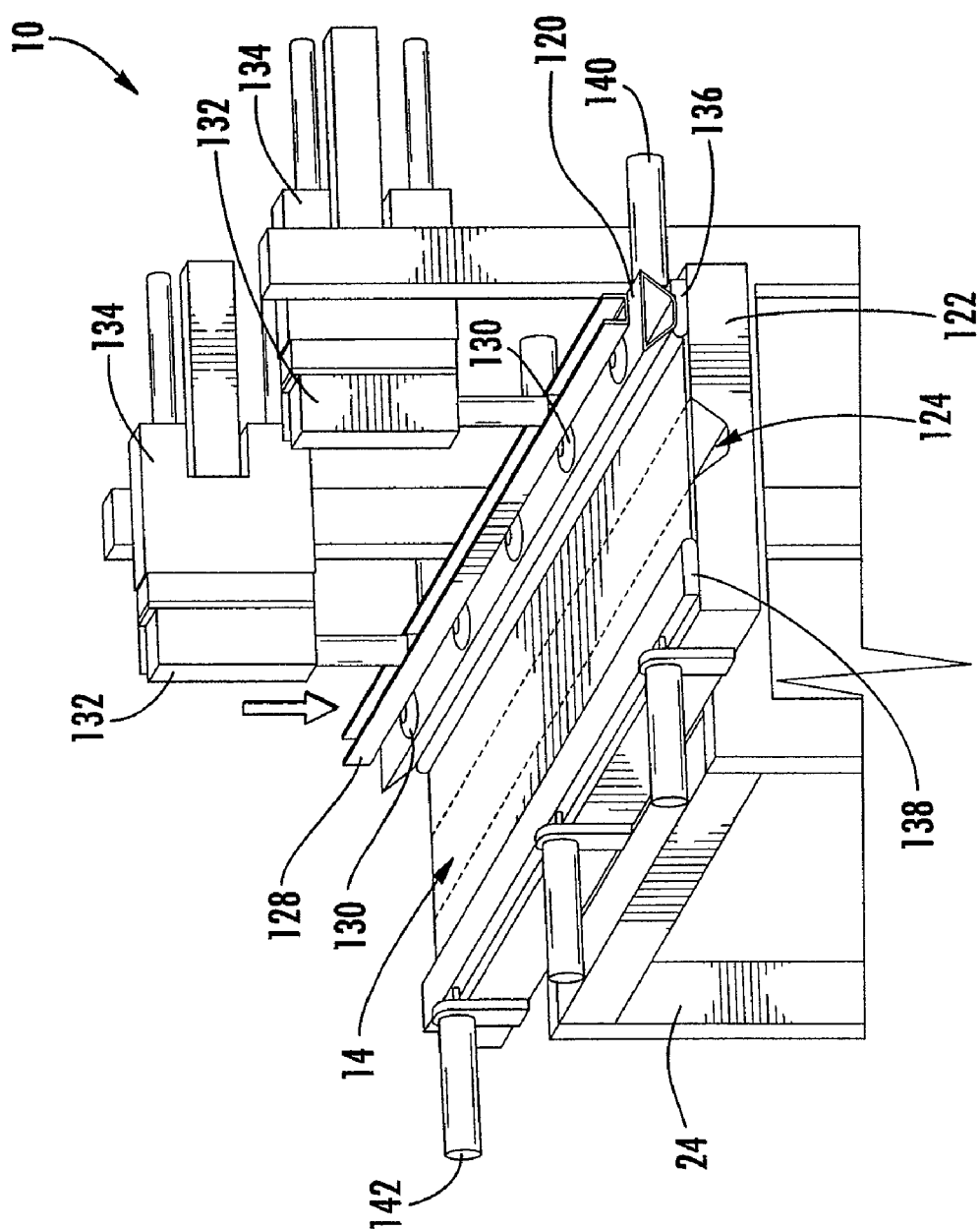
Figure 26:
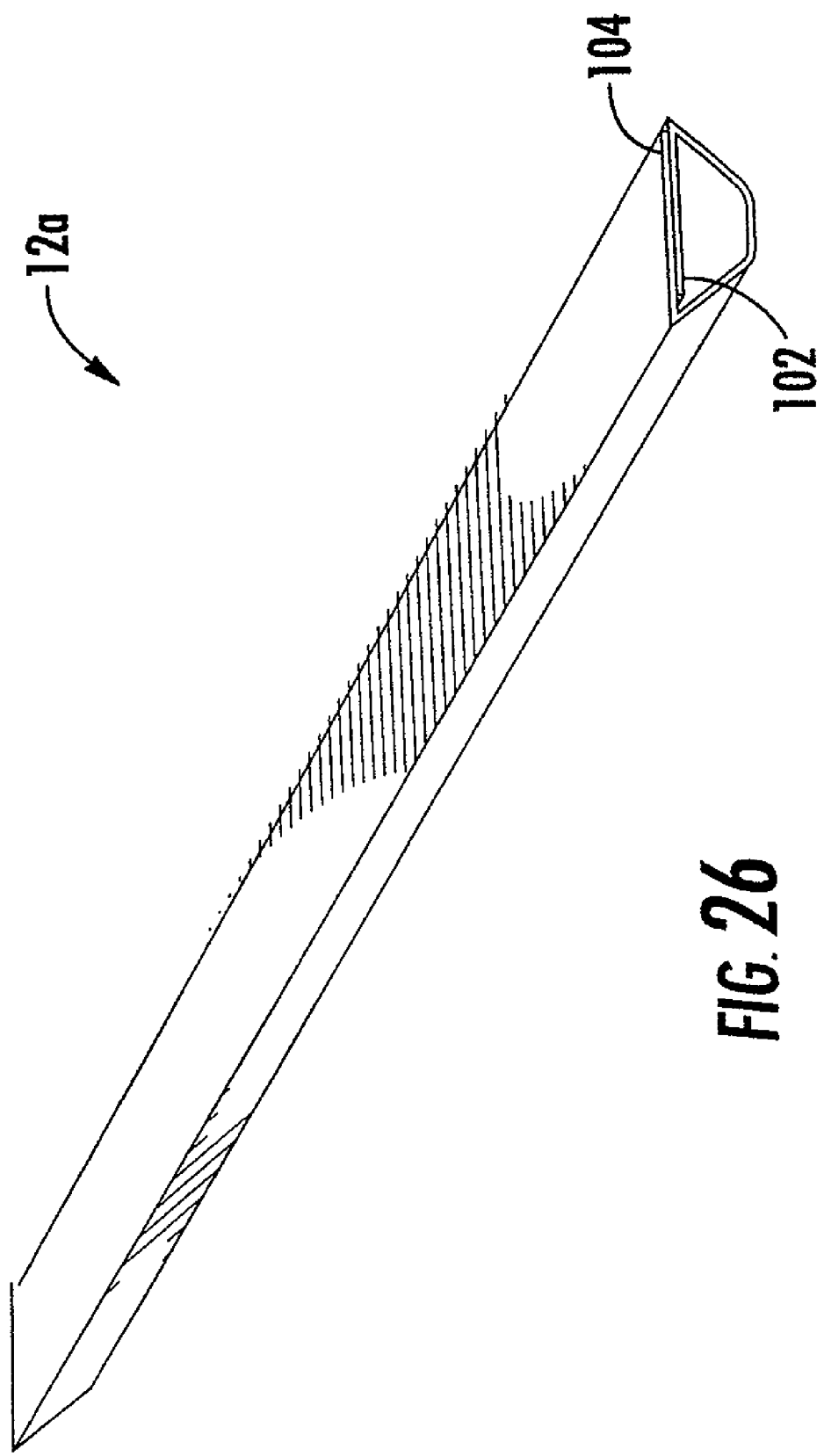
FIG. 26 is a perspective view illustrating a hat section stiffened composite formed by the apparatus of FIG. 15.

While the structural member 12 formed according to the foregoing discussion defines a slot or channel 18 along its length, the apparatus 10 of the present invention can also be used to form partially or fully closed structural members 12a (FIG. 26). For example, FIGS. 14 and 15 illustrate another embodiment of the apparatus 10, which can be used to wrap a composite material around an internal tool 120 to form the tube-like structural member 12a. The apparatus 10 includes a frame 24 for supporting a die 122, which defines a channel, slot, cavity, or other recess 124 for receiving the charge 14. As illustrated, the die 122 defines a fixed configuration, but in other embodiments the die 122 can include multiple portions that can be adjusted to change the size and/or configuration of the recess 124, e.g., as described in connection with portions 30, 32. In either case, the die 122 can be supported by the frame 24 in a predetermined configuration. Thus, as shown in FIG. 16, the charge 14 can be provided on the die 122 and thereby indexed to a predetermined configuration relative to the apparatus 10.

Figure 18:
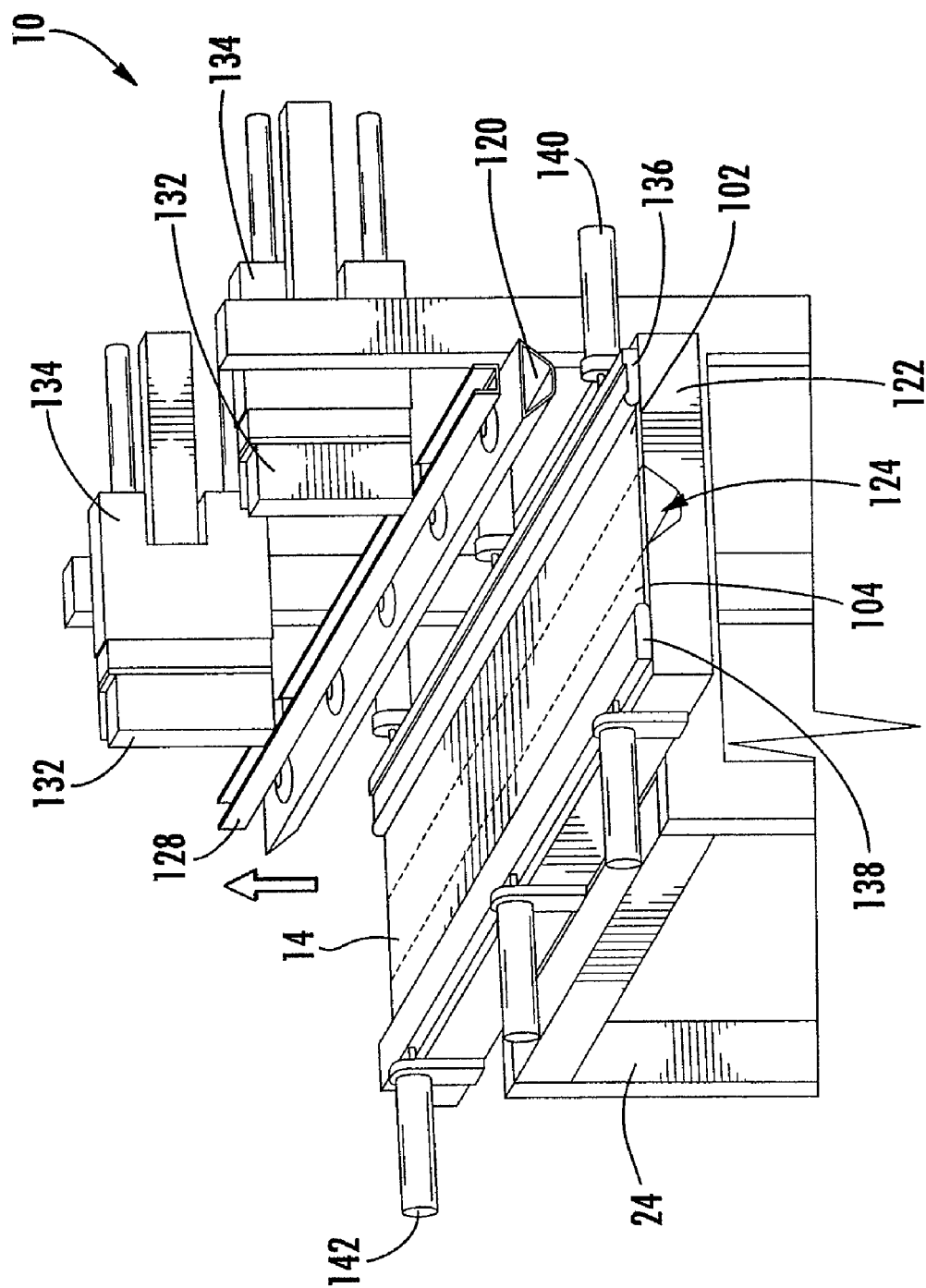
Figure 19:
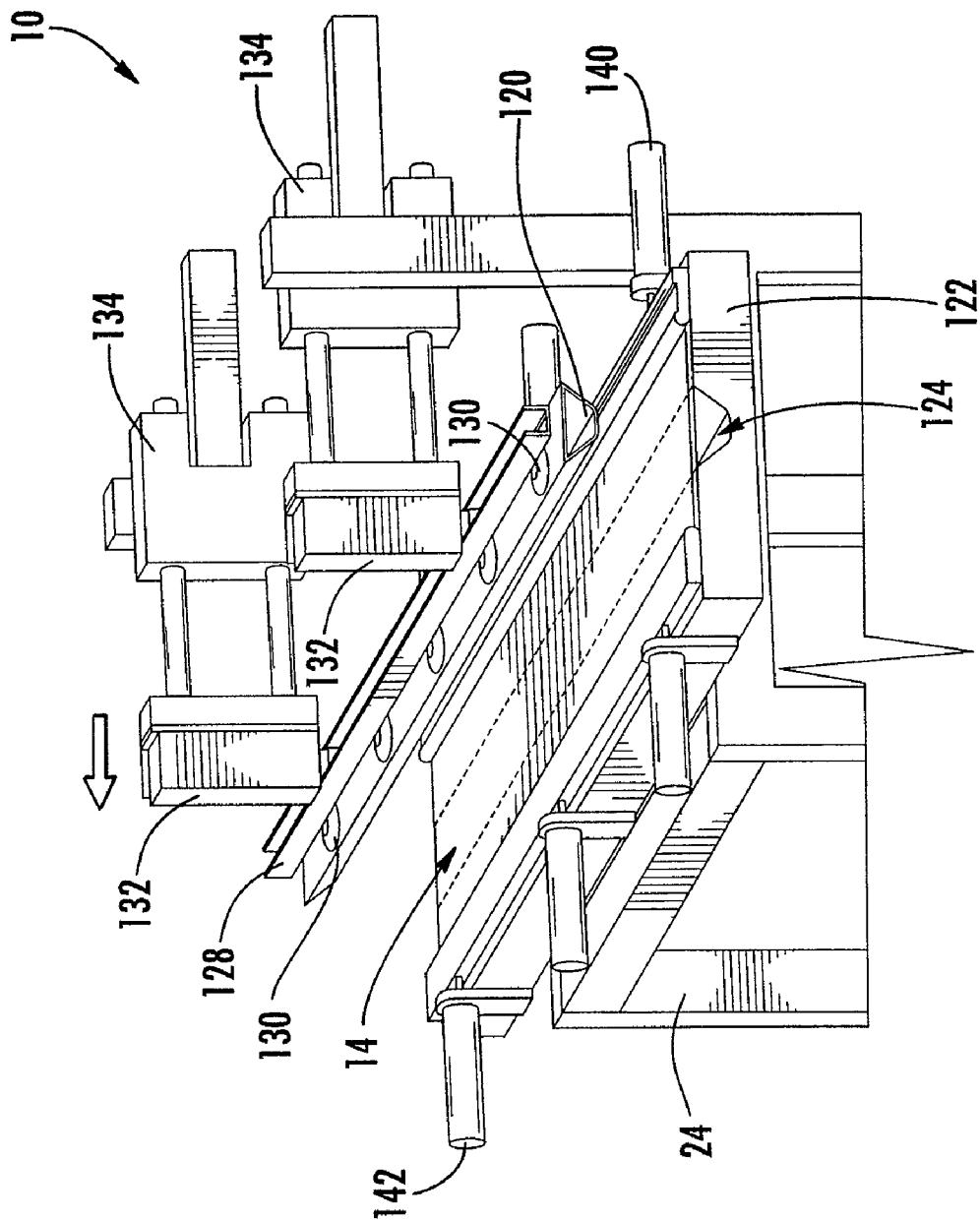
Figure 20:
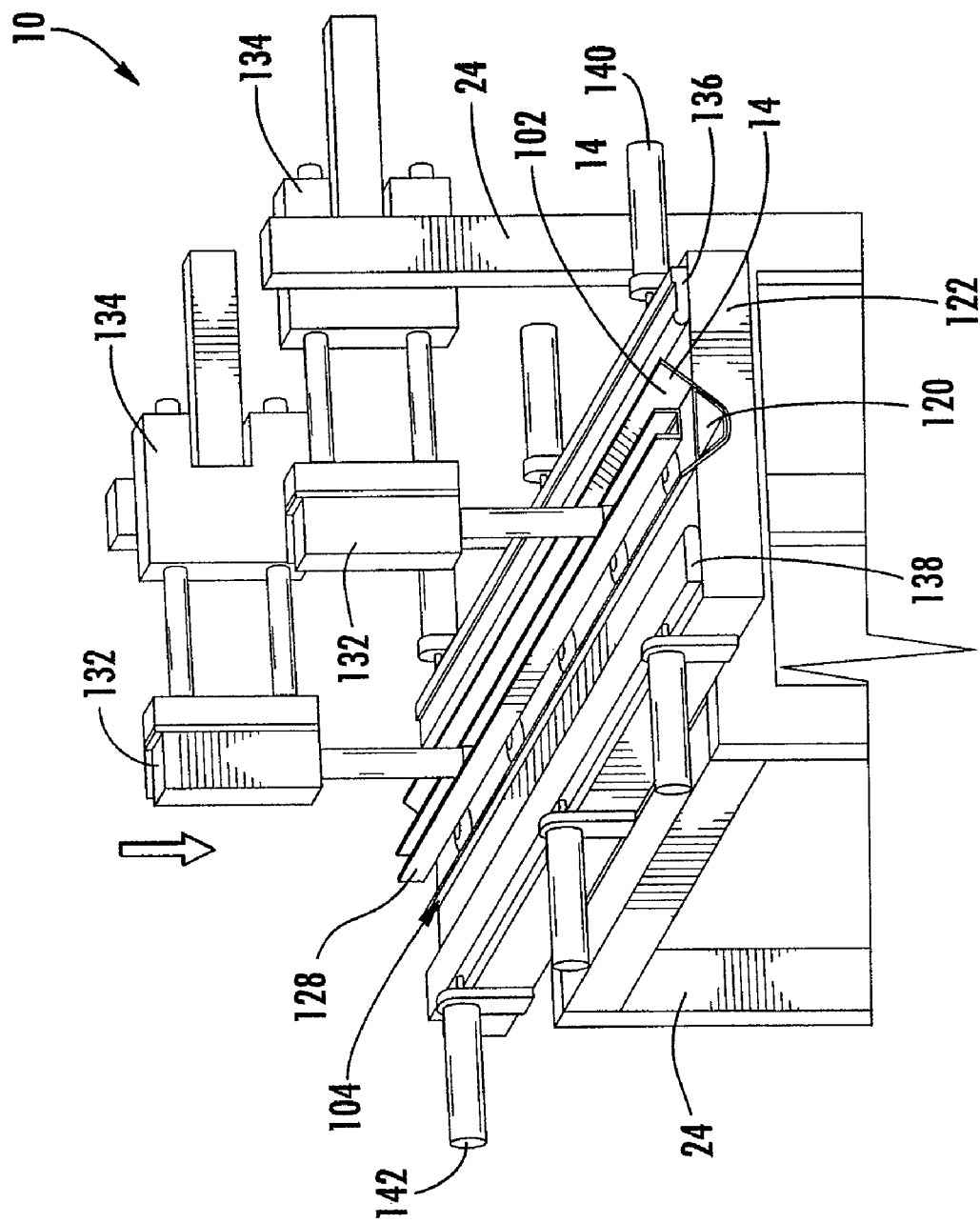
Figure 21:
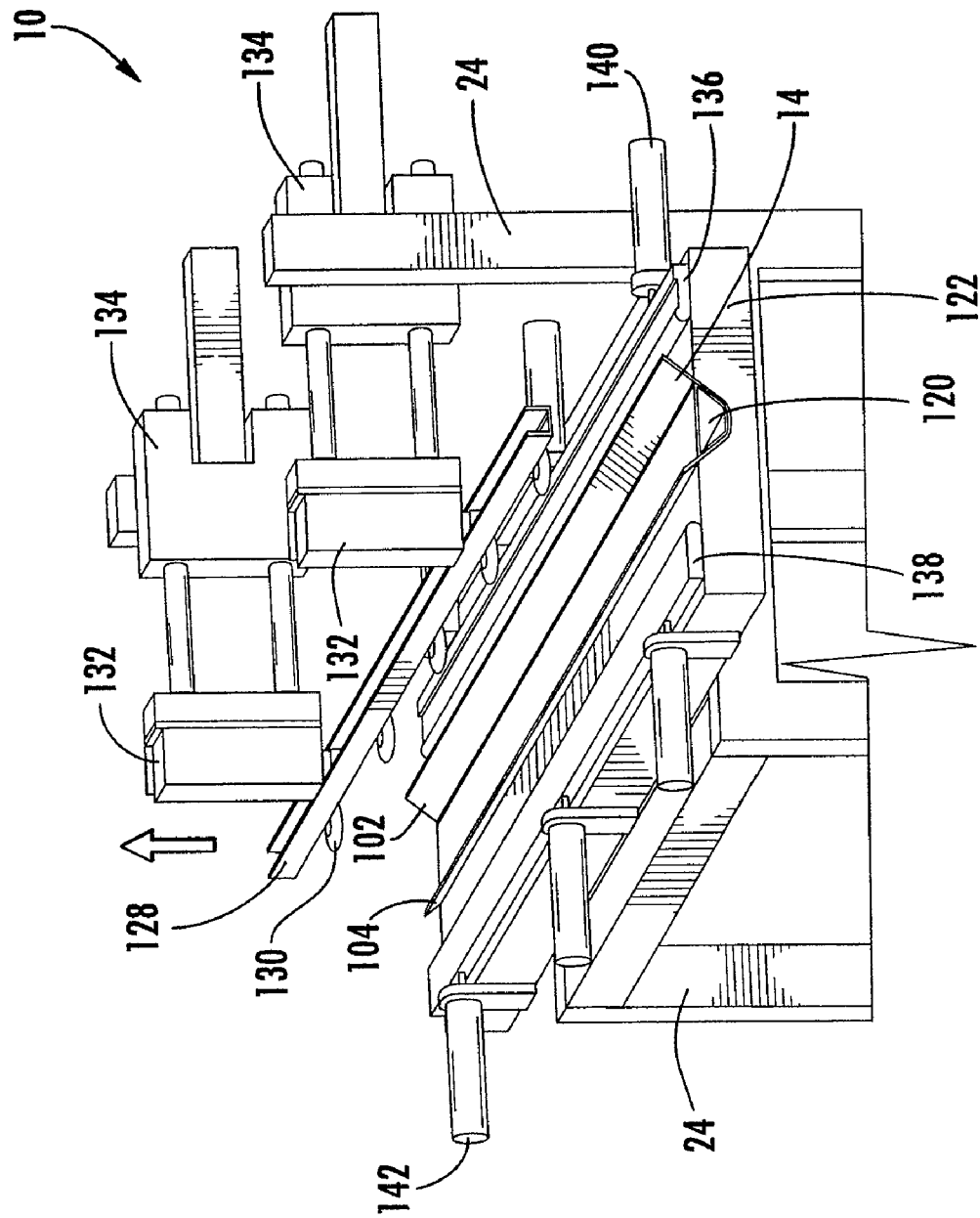

The second die or tool of the apparatus 10 is the internal tool 120. The apparatus 10 can automatically position the internal tool 120 for forming and, in some cases, the internal tool 120 can be disconnected from the rest of the apparatus 10. For example, the apparatus 10 can include a positioning device 126 for moving the internal tool 120 during forming. The positioning device 126 can selectively engage the internal tool 120, e.g., using a vacuum rail 128 that evacuates air from a plurality of vacuum attachment devices 130 positioned along the length of the rail 128. Thus, the positioning device 126 can engage the internal tool 120 and position the tool 120, then disengage or release the internal tool 120 so that the charge 14 can be wrapped around the tool 120 without interference by the positioning device 126. For example, as shown in FIG. 16, the internal tool 120 can be positioned remotely from the recess 124 so that the charge 14 can be disposed over the recess 124. Thereafter, a first set of actuators 132 of the positioning device 126 be used to extend the vacuum rail 128 to the internal tool 120 so that the vacuum attachment devices 130 can engage the internal tool 120. The positioning device 126 can then urge the internal tool 120 into the recess 124 to at least partially form the charge 14. For example, the actuators 132 of the positioning device 126 can lift the internal tool 120 (FIG. 18), a second set of actuators 134 of the positioning device 126 can adjust the internal tool 120 to a position in alignment with the recess 124 (FIG. 19), and the first set of actuators 132 can extend the internal tool 120 against the charge 14 and into the recess 124 so that the charge 14 is formed into the recess 124 between the die 122 and the internal tool 120 (FIG. 20). The positioning device 126 can then release the internal tool 120 in the recess 124 and retract at least partially from the internal tool 120 to facilitate the wrapping of the composite charge 14 around the internal tool 120 (FIG. 21).

Figure 22:
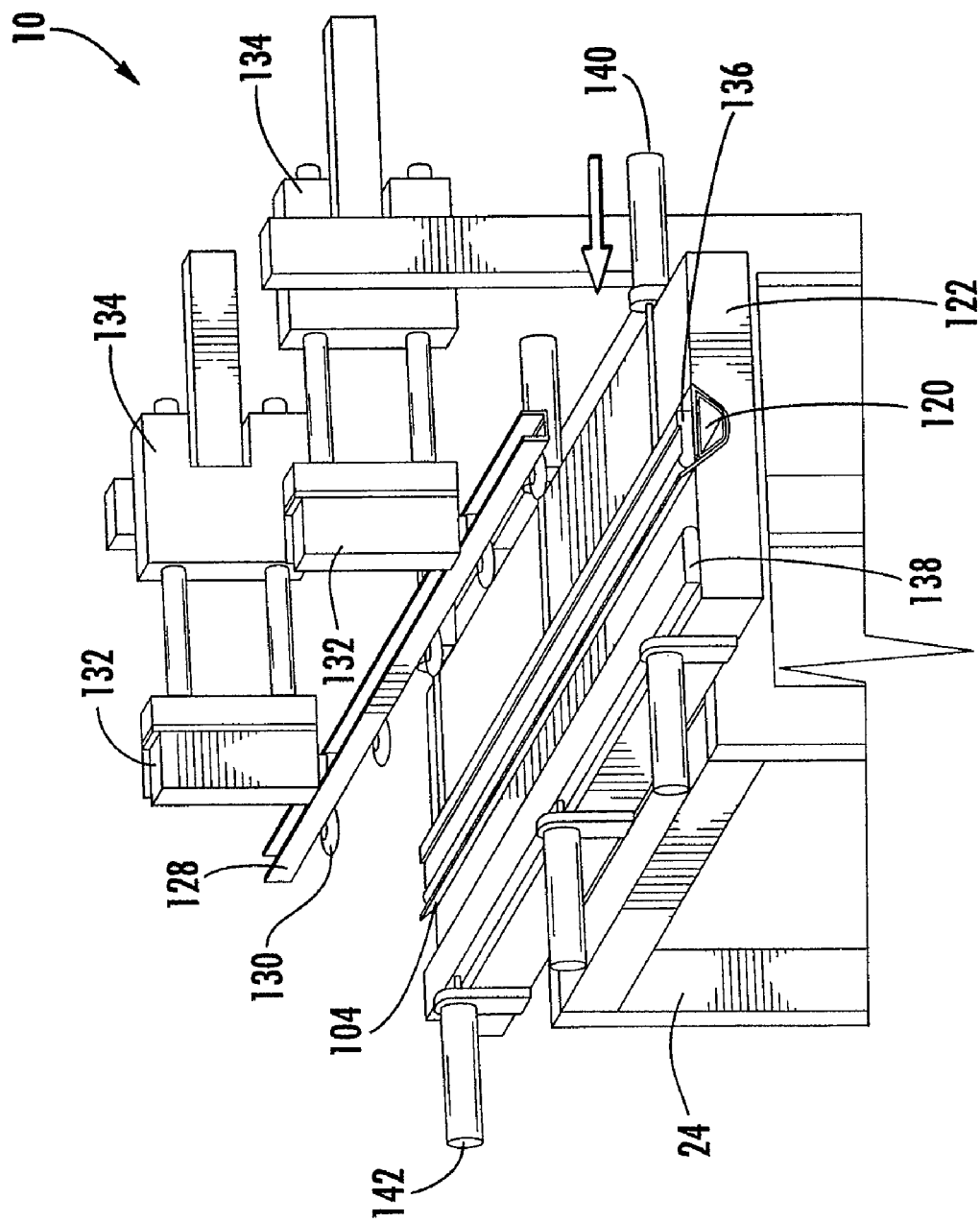
Figure 23:
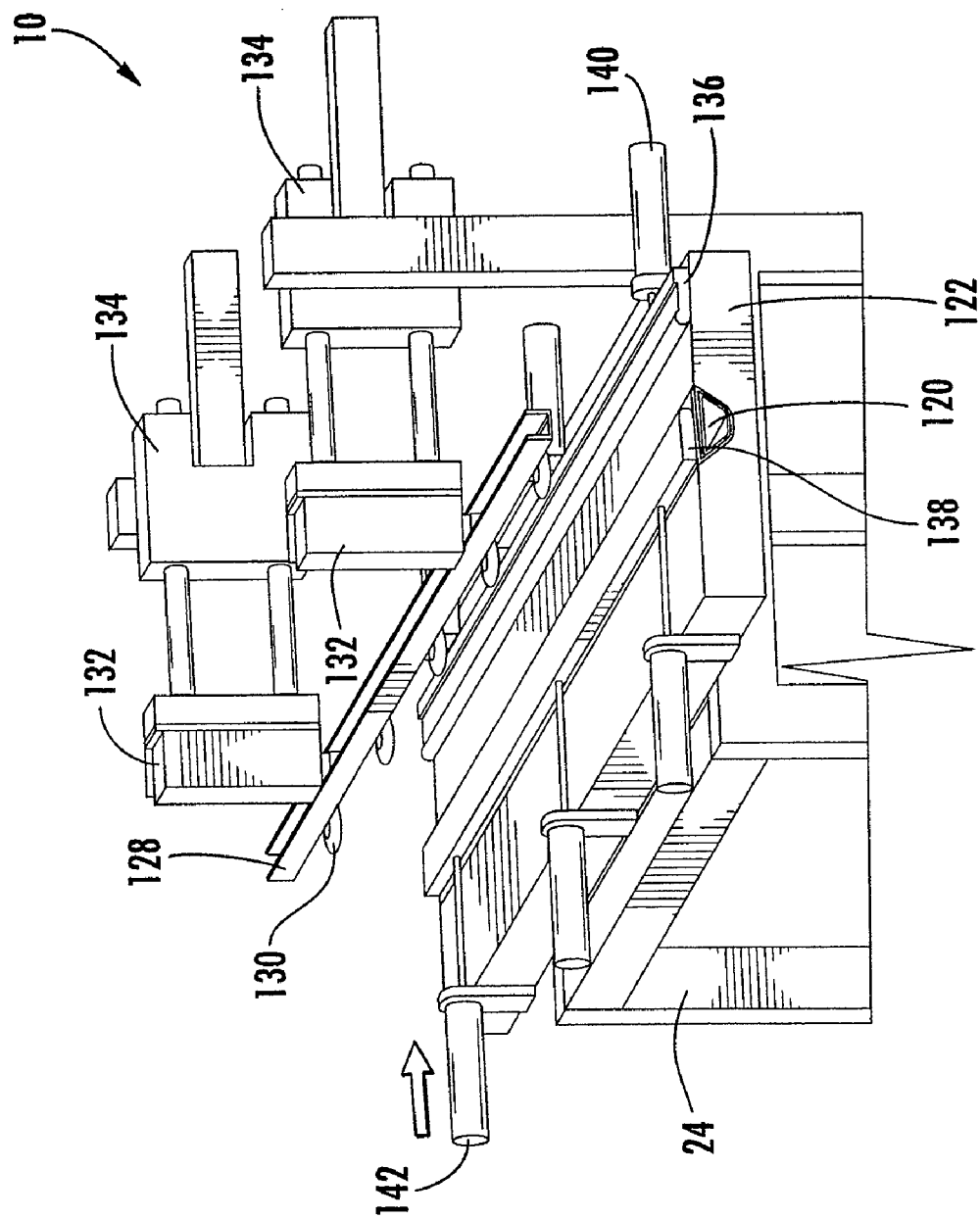

In particular, a first forming bar 136 can slide inward on the die 122 to a position in which the internal tool 120 is disposed between the die 122 and the forming bar 136. In this way, the forming bar 136 can bend one of the transverse edges 102, 104 of the charge 14 against the internal tool 120 (FIG. 22). The first forming bar 136 can be retracted, and a second forming bar 138 can then extend to bend the other transverse edge 102, 104 of the charge 14 against the internal tool 120 (FIG. 23). Each forming bar 136, 138 can be extended and retracted by one or more actuators 140, 142, such as electric, pneumatic, or hydraulic actuation devices. The apparatus 10 can also include a heater 144 for heating the charge 14 to facilitate the forming of the charge 14. For example, one or both of the forming bars 136, 138 can include a heater 144, such as an internal electric resistive heating device that heats the charge 14 to a desired temperature and thereby softens the charge 14. The internal tool 120 can also be heated by the heater 144, for example, by resting the tool 120 on the forming bar 136 as shown in FIGS. 15 and 16. Other types of heaters can also be used to heat the charge 14 during forming, such as conduction or convection heaters, a resistive heater disposed in or on the second die 28, or a heated blanket or other material that is placed in contact with the charge 14 or the apparatus 10 to thereby conductively heat the charge 14 or apparatus 10.

Figure 24:
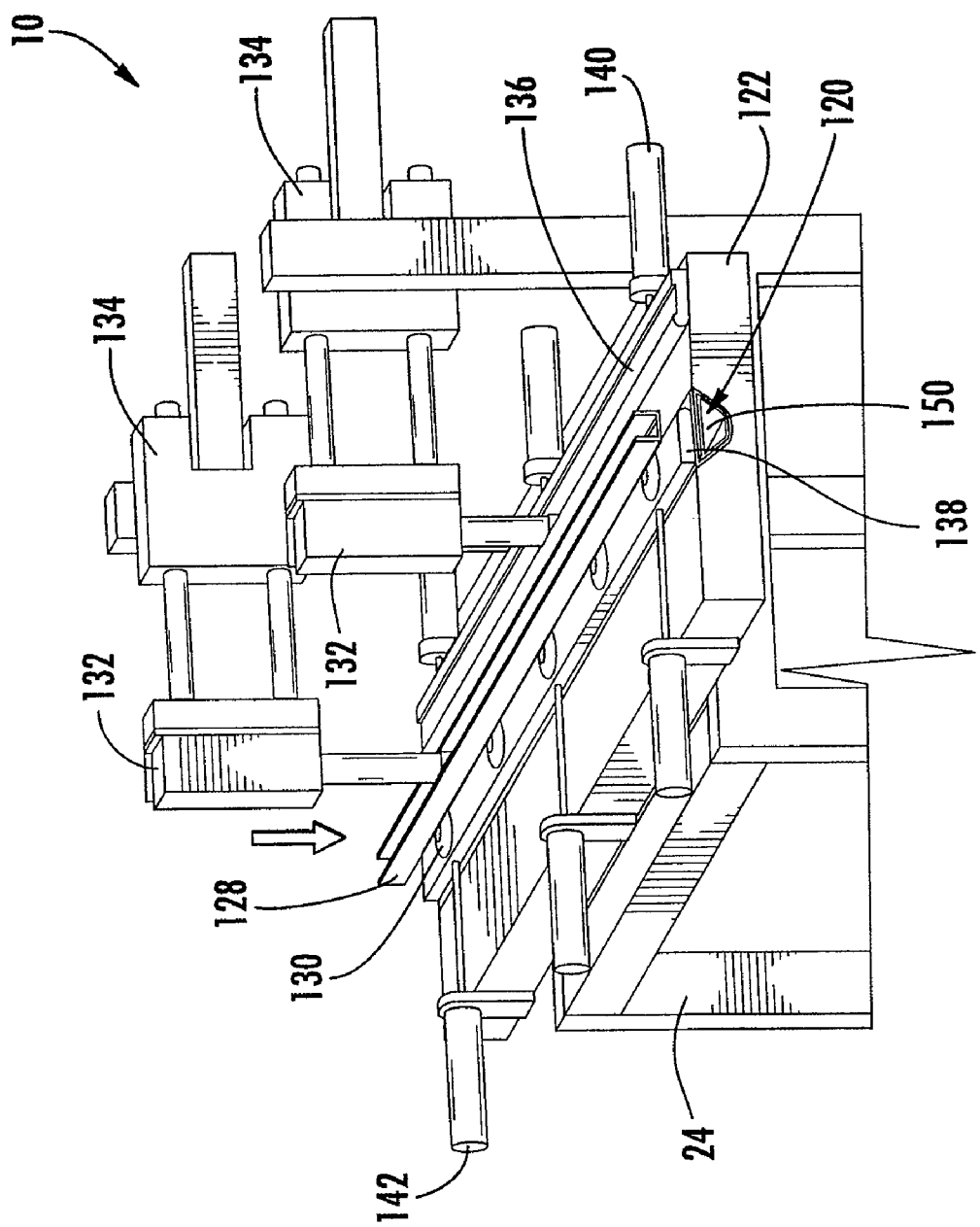
Figure 25:
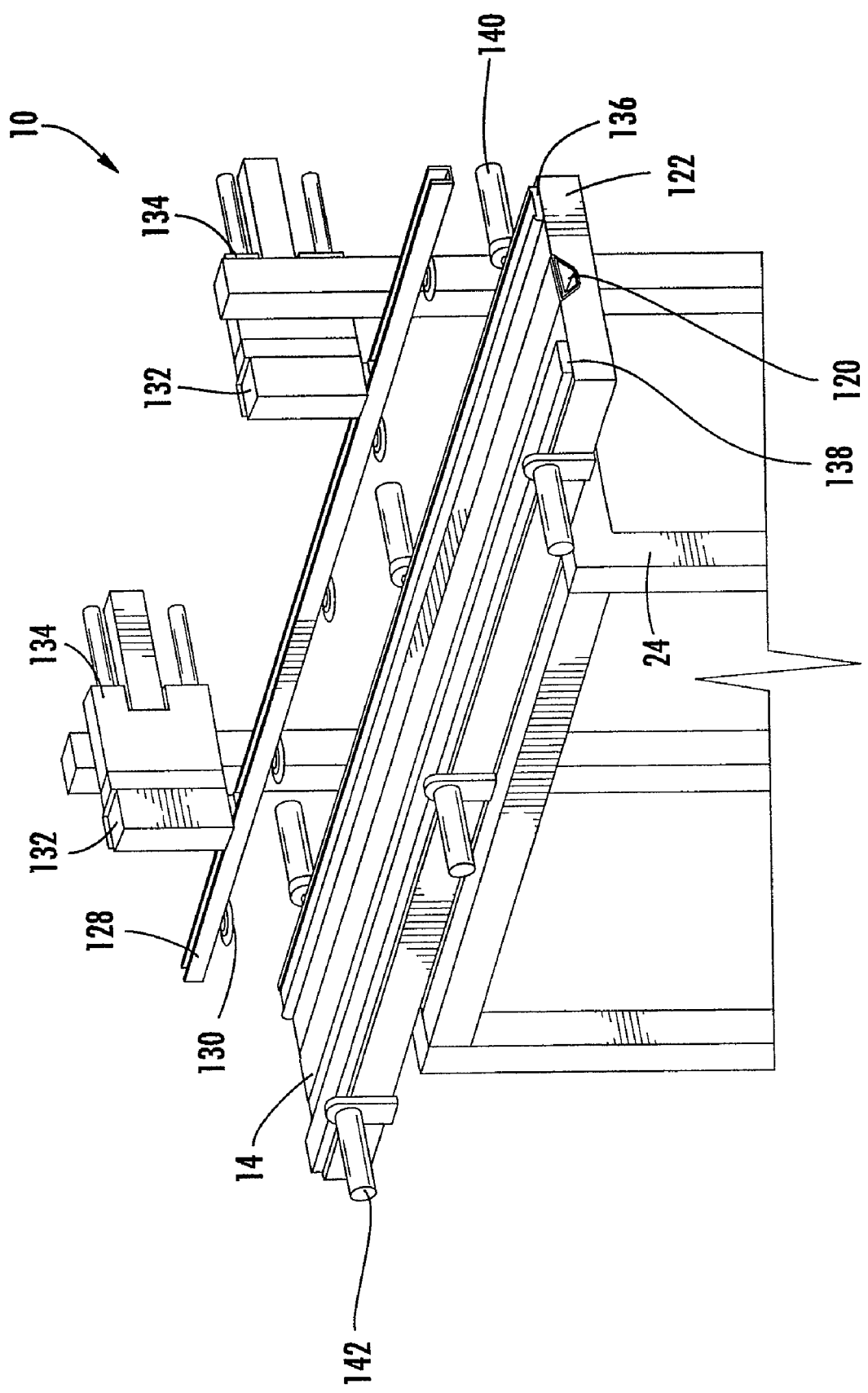

The charge 14 can then be compacted in the desired configuration. For example, with the edges 102, 104 of the charge 14 folded against the internal tool 120 and the second forming bar 138 disposed opposite the edges 102, 104 from the internal member 120, the positioning device 126 is again extended and exerts a force against the second forming bar 138, thereby compressing the edges 102, 104 of the charge 14 between the internal tool 120 and the second forming bar 138. In some cases, the internal tool 120 can be a rigid member, such that the edges 102, 104 of the charge 14 are compressed between the second forming bar 138 and the internal tool 120. In addition, such a rigid internal tool can include apertures on its surface through which ambient air can be evacuated, e.g., by an evacuation device fluidly connected to an internal chamber of the tool. Thus, the evacuation device can draw the charge 14 against the outer surface of the tool. Alternatively, as shown in FIG. 24, the internal tool 120 can be an inflatable bladder that is configured to receive a fluid from a pressurized fluid source 150 and thereby expand against the die 122 and the forming bar 138. In this regard, the bladder can be expanded while positioned in the recess 124 to thereby provide sufficient rigidity to oppose the compressive force for compacting the charge 14. After forming and compacting the charge 14 to the desired configuration of the structural member 12, the positioning device 126 and the forming bar 138 are retracted so that the structural member 12 is again exposed, and the pressurized fluid provided in the internal tool (if applicable) is released. Thus, the structural member 12 can be removed from the die 122 and the internal tool 120 can be removed from the structural member 12. In some cases, the structural member 12 can be further processed while supported by the die 122, e.g., to trim the structural member 12 to a desired configuration, otherwise provide features in the structural member 12, further cure the structural member 12, or the like. In this regard, the die 122 can be readily removable from the support frame 24 so that the structural member 12 can be transported on the die 122 to other stations or equipment for processing the structural member 12. That is, the die 122 can be adapted to be removed without significant reconfiguration of the support frame 24 or the die 22, e.g., without cutting, bending, unscrewing, unbolting, or otherwise disconnecting the die 122 from the support frame 24 other than releasing readily removable connections such as the locking devices 74.

In each of the examples, the apparatus 10 of the present invention is described as including a movable male forming member 28, 120 that is adjusted into a recess 42, 124 defined by a female forming member 26, 122. However, in some cases, the male forming member can be a stationary device, and the female forming member is adjusted toward the male member. In either case, the charge 14 can be formed to the desired shape of the structural member 12. Further, the structural member 12 can be removed from both of the forming members, or the structural member 12 can be supported by one or both of the forming members during a subsequent processing operation.

Many modifications and other embodiments of the invention will come to mind to one skilled in the art to which this invention pertains having the benefit of the teachings presented in the foregoing descriptions and the associated drawings. Therefore, the invention is not to be limited to the specific embodiments disclosed and modifications and other embodiments are intended to be included within the scope of the appended claims. Although specific terms are employed, they are used in a generic and descriptive sense only and not for purposes of limitation.

What is claimed is:

1. An apparatus for forming a structural member from a charge, the apparatus comprising:
    a support frame;
    a first die supported by the frame, the first die having first and second longitudinal portions, at least one of the portions being transversely adjustable between first and second positions and structured in the second position to cooperatively define a recess;
    a second die supported by the frame, the second die extending longitudinally and defining an outer surface corresponding to the recess defined by the first die; and
    at least one motion control device configured to oppose a transverse adjustment of at least one of the portions of the first die from the second position to the first position, wherein at least one of the dies is adjustable relative to the frame in a direction toward the other die to at least partially insert the second die into the recess defined by the first die, and wherein the first die is supported by the frame such that insertion of the second die into the recess overcomes opposition provided by the at least one motion control device and causes at least one of the portions of the first die to adjust transversely outward and form the charge between the first and second dies to the configuration of the structural member.

2. An apparatus according to claim 1, further comprising at least one lock device for retaining each of the portions of the first die in a respective position.

3. An apparatus according to claim 1 wherein the first die is adapted to restrain a transverse motion of the charge such that opposite surfaces of the charge are stressed in tension during forming.

4. An apparatus according to claim 1 wherein at least one of the dies is flexible.

5. An apparatus according to claim 1 wherein at least one of the first and second dies defines a plurality of segments connected longitudinally.

6. An apparatus according to claim 1, further comprising:
a support tray configured to support the first and second portions of the first die; and
at least one lock device for retaining each of the portions of the first die in a respective position relative to the support tray.

7. An apparatus according to claim 1 wherein each of the portions of the first die defines a surface outside the recess for supporting the charge, each surface defining apertures configured to evacuate gas and thereby constrain the charge to the surface.

8. An apparatus for forming a structural member from a charge, the apparatus comprising:
a support frame;
a first die supported by the frame, the first die having first and second longitudinal portions, at least one of the portions being transversely adjustable between first and second positions and structured in the second position to cooperatively define a recess, the first die being configured in the second position to permit further movement transversely outward in response to a force directed in transversely outward direction; and
a second die supported by the frame, the second die extending longitudinally and defining an outer surface corresponding to the recess defined by the first die;
wherein at least one of the dies is adjustable relative to the frame in a direction toward the other die to at least partially insert the second die into the recess defined by the first die, and wherein the first die is supported by the frame such that at least partial insertion of the second die into the recess causes at least one of the portions of the first die to move transversely outward and away from one another in order to form the charge between the first and second dies to the configuration of the structural member.

9. An apparatus according to claim 8, further comprising at least one lock device for retaining each of the portions of the first die in a respective position.

10. An apparatus according to claim 8 wherein the first die is adapted to restrain a transverse motion of the charge such that opposite surfaces of the charge are stressed in tension during forming.

11. An apparatus according to claim 8 wherein at least one of the dies is flexible.

12. An apparatus according to claim 8 wherein at least one of the first and second dies defines a plurality of segments connected longitudinally.

13. An apparatus according to claim 8, further comprising:
a support tray configured to support the first and second portions of the first die; and
at least one lock device for retaining each of the portions of the first die in a respective position relative to the support tray.

14. An apparatus according to claim 8 wherein each of the portions of the first die defines a surface outside the recess for supporting the charge, each surface defining apertures configured to evacuate gas and thereby constrain the charge to the surface.

15. An apparatus for forming a structural member from a charge, the apparatus comprising:
a die defining an aperture corresponding to a predetermined configuration of the structural member, said die comprising first and second portions defining the aperture therebetween;
a tool configured to be inserted into the aperture;
a positioning device configured to insert the tool at least partially into the aperture and thereby form the charge to a configuration defined between the tool and the die, wherein the die is configured such that insertion of the tool at least partially into the aperture causes at least one of the first and second portions to adjust outwardly;
at least one forming device configured to adjust a portion of the charge outside the aperture of the die and thereby wrap the charge at least partially around the tool,
wherein at least one of the forming device and the positioning device is configured to compact the charge against the tool and thereby form the structural member in the predetermined configuration of the structural member.

16. An apparatus according to claim 15 wherein the tool comprises an inflatable bladder.

17. An apparatus according to claim 15 wherein the positioning device is configured to selectively engage and disengage the tool such that the tool is configured to be wrapped with the charge.

18. An apparatus according to claim 15 wherein the positioning device is configured to urge the tool into the aperture in a first direction and the forming device is configured to extend in a second direction generally transverse to the first direction such that the forming device bends at least one edge of the charge about the tool.

19. An apparatus according to claim 15 further comprising:
a support tray configured to support the first and second portions of the die; and
at least one lock device for retaining each of the portions of the die in a respective position relative to the support tray.

* * * * *